Nov. 4, 1941.  J. A. H. BARKEIJ  2,261,898
AUTOMATIC GEARSHIFT TRANSMISSION FOR AUTOMOBILES TOGETHER WITH
IMPROVEMENTS IN CLUTCHES AND GEARBOXES
Filed June 20, 1933  7 Sheets-Sheet 1
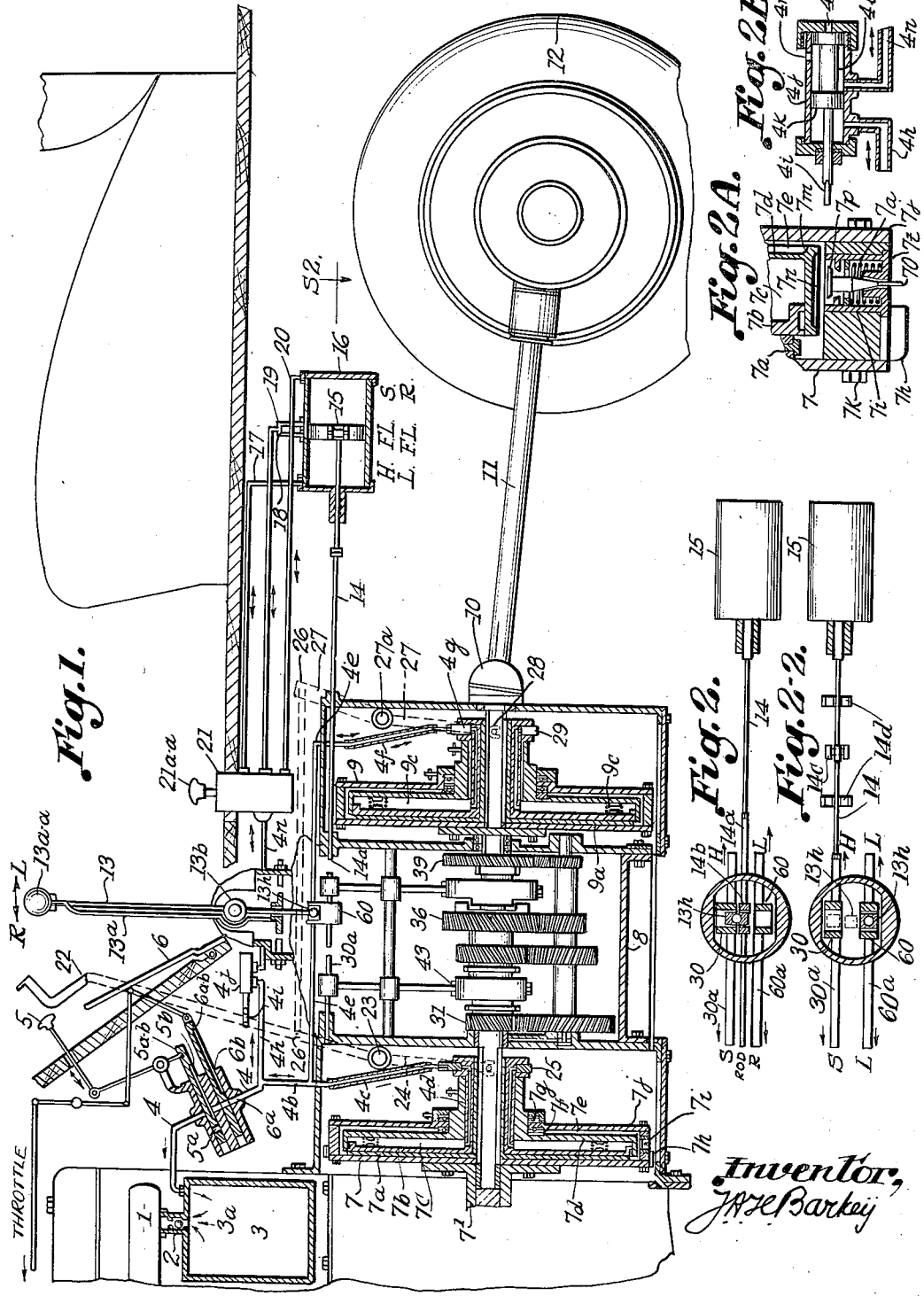
Inventor,
J. A. H. Barkeij

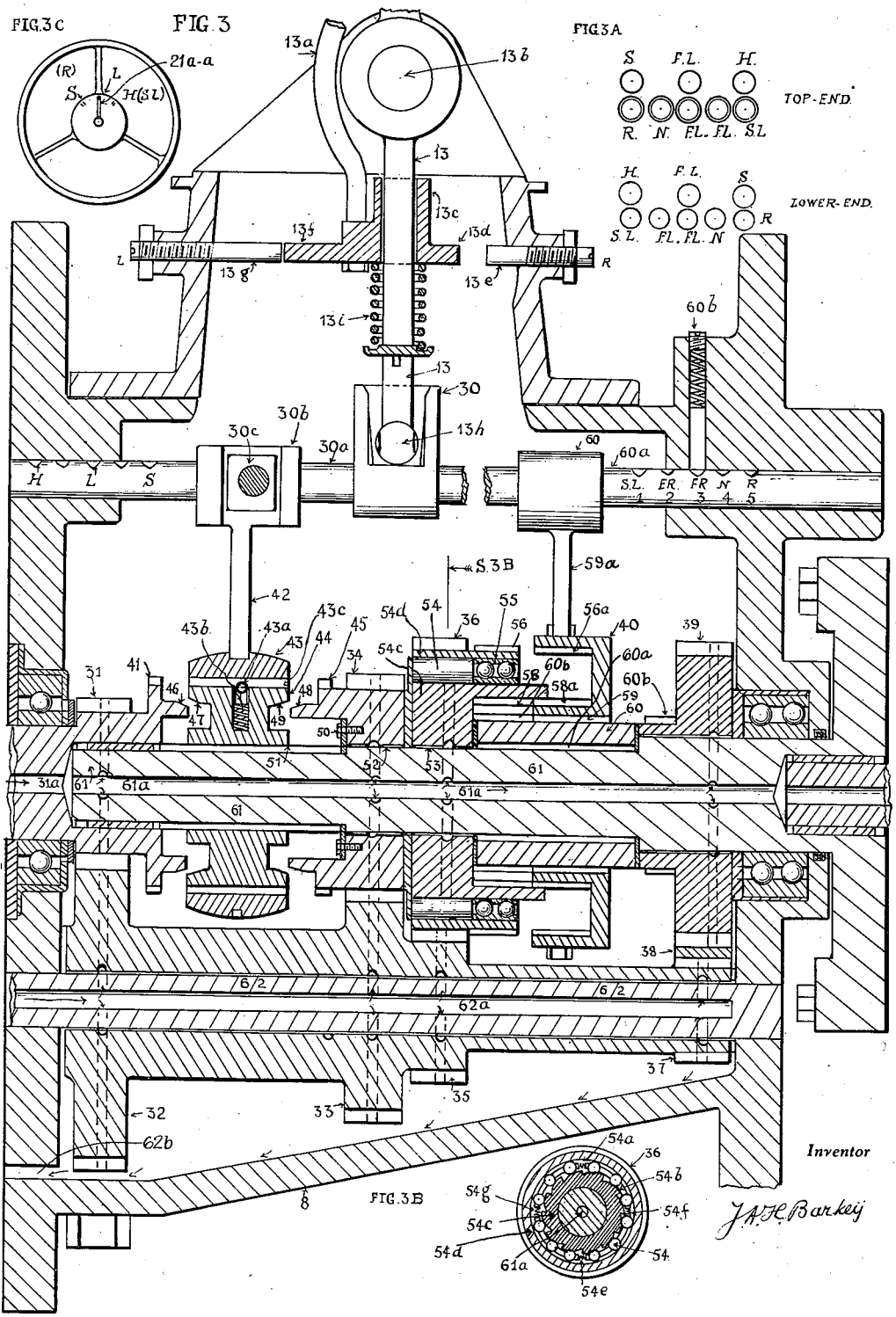

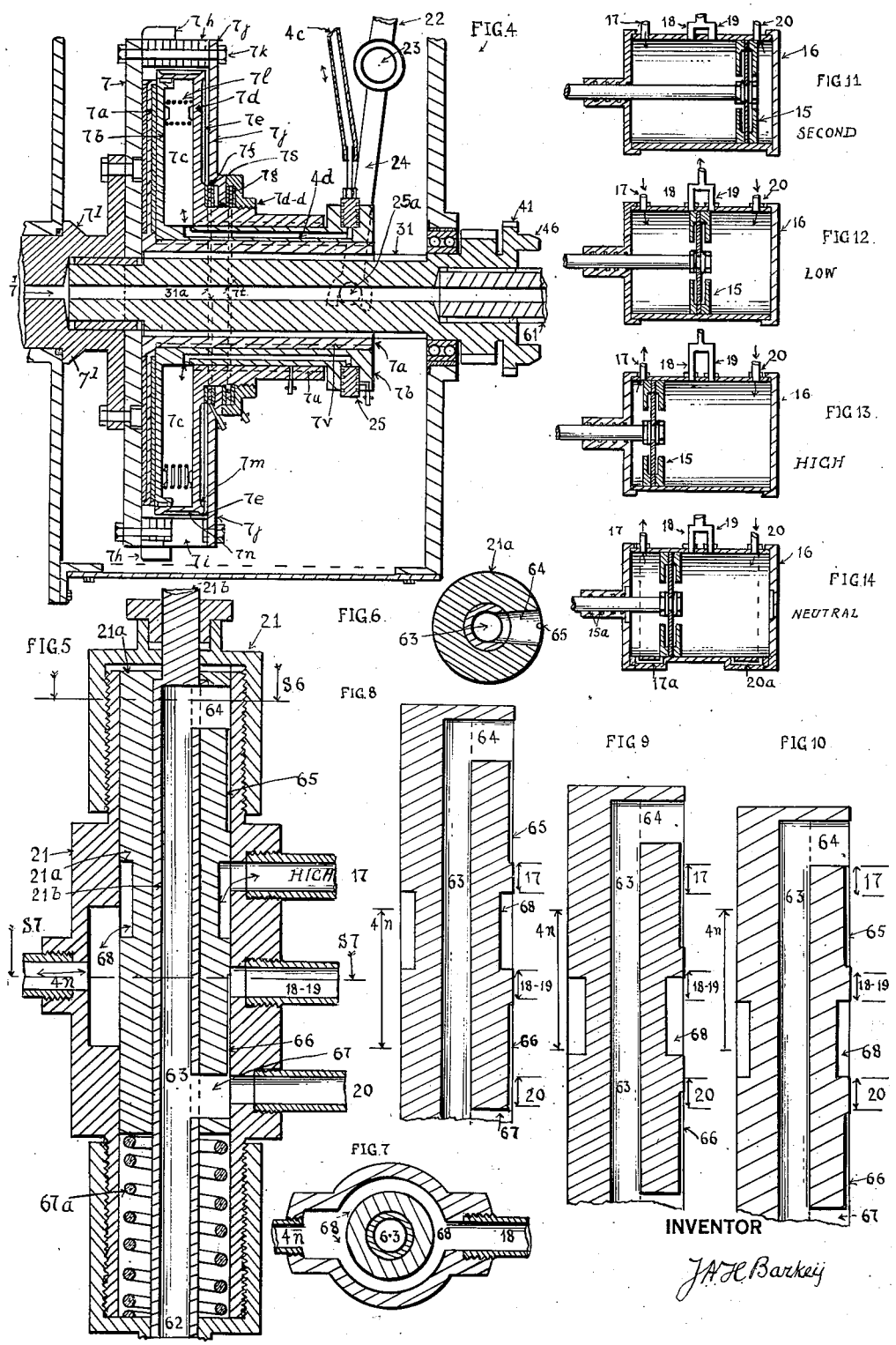

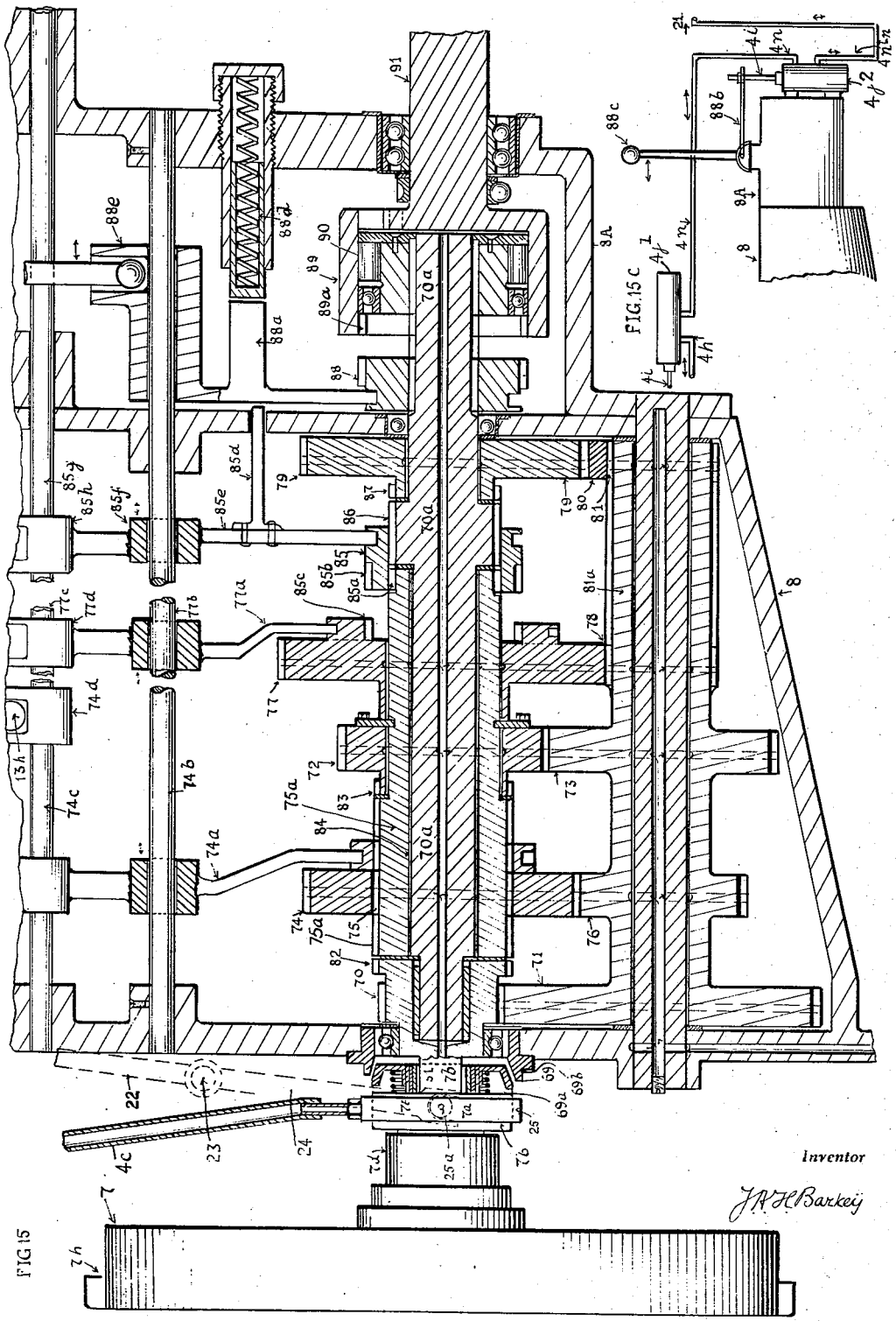

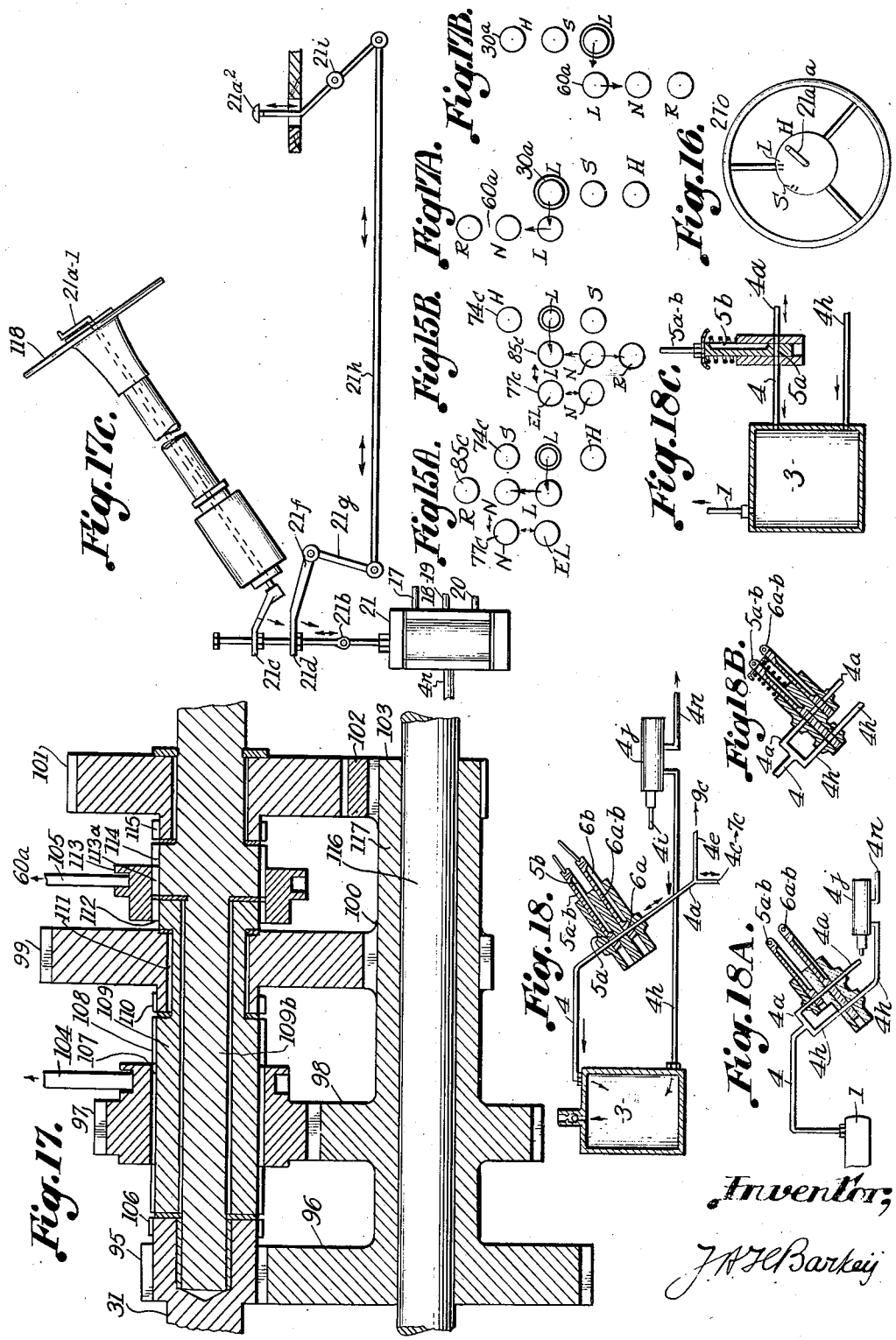

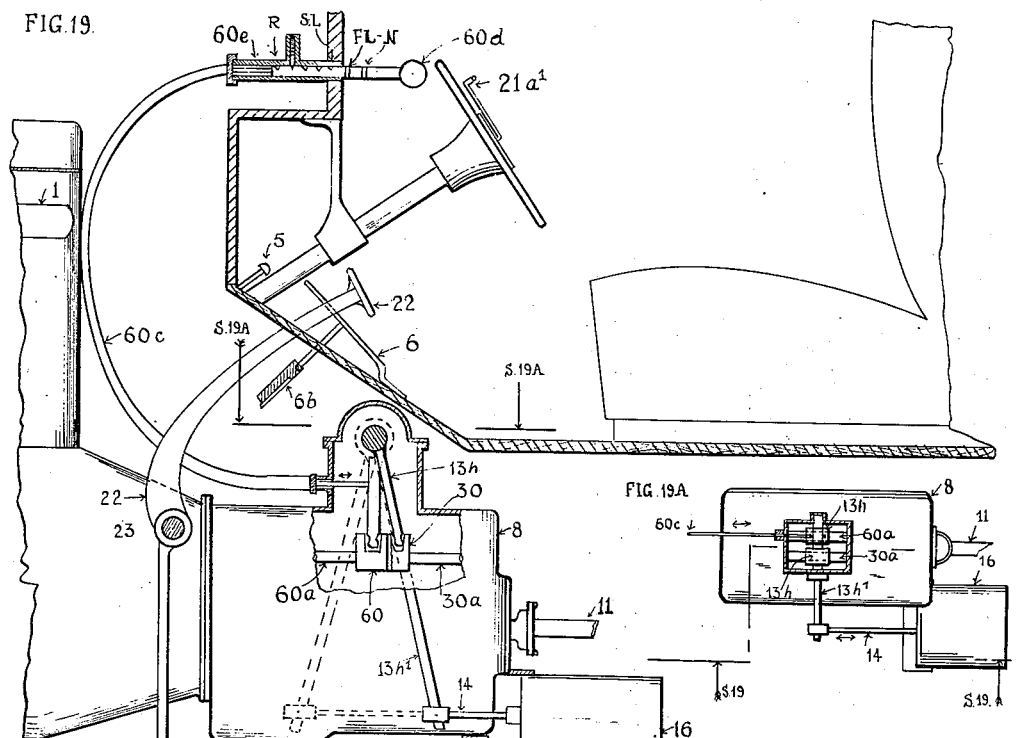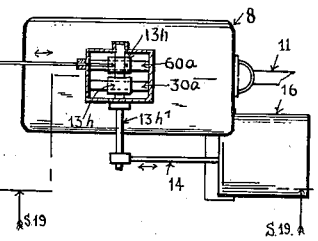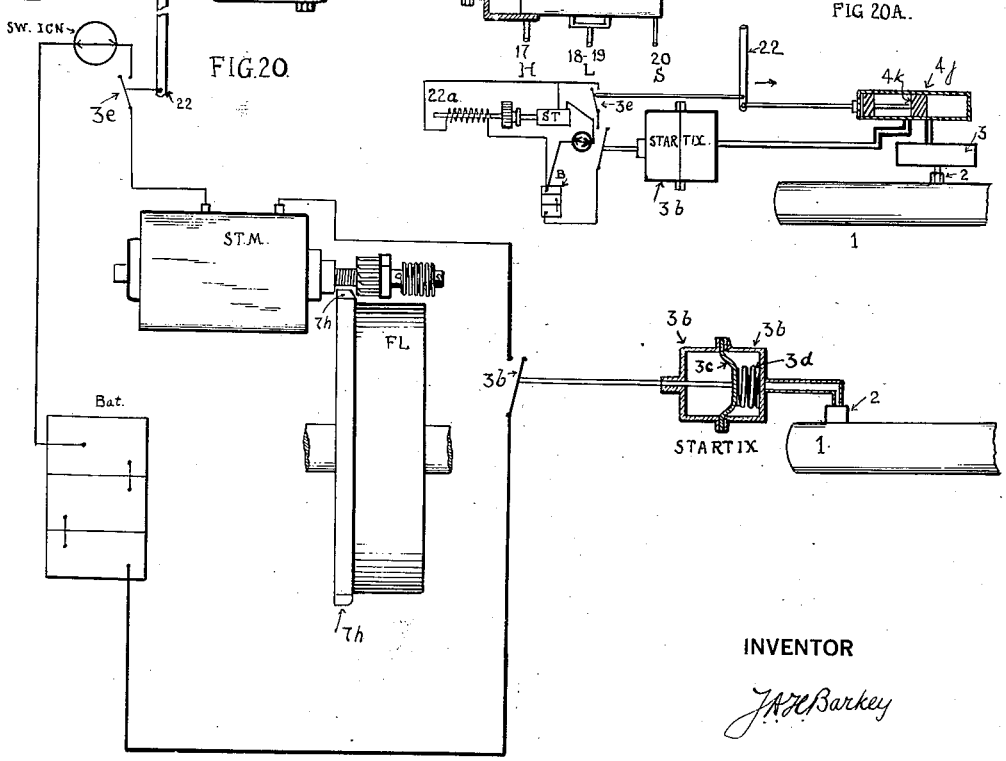

Nov. 4, 1941.  J. A. H. BARKEIJ  2,261,898
AUTOMATIC GEARSHIFT TRANSMISSION FOR AUTOMOBILES TOGETHER WITH
IMPROVEMENTS IN CLUTCHES AND GEARBOXES
Filed June 20, 1933   7 Sheets-Sheet 7
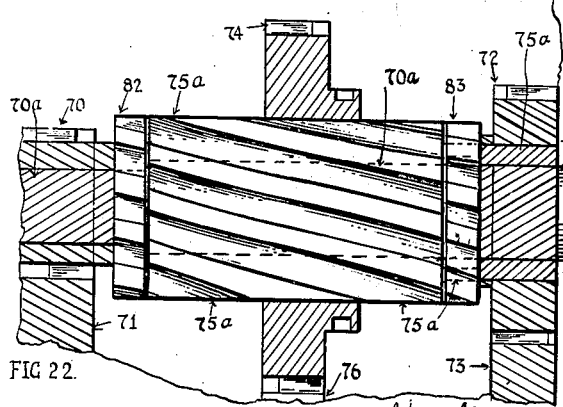
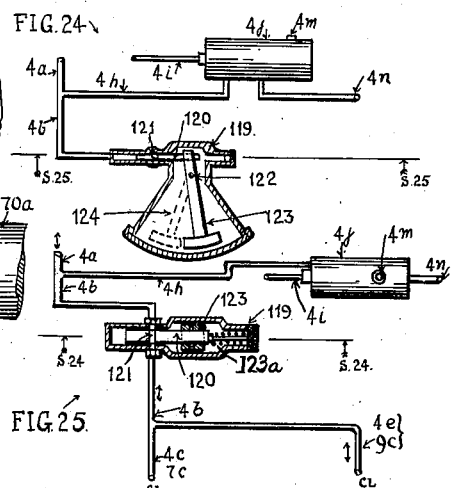
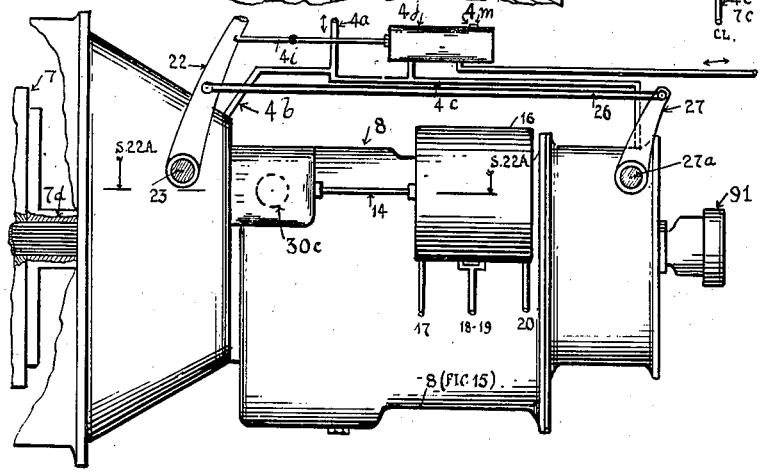
INVENTOR
J.A.H.Barkeij Patented Nov. 4, 1941

2,261,898

UNITED STATES PATENT OFFICE 2,261,898

AUTOMATIC GEARSHIFT TRANSMISSION FOR AUTOMOBILES TOGETHER WITH IMPROVEMENTS IN CLUTCHES AND GEARBOXES

Jean A. H. Barkeij, Altadena, Calif.

Application June 20, 1933, Serial No. 676,646

13 Claims. (Cl. 192—.01)

In the present construction the brake between the front clutch and gearbox may be applied if the synchromesh-arrangement of Fig. 3 is omitted, and the synchromesh arrangement shown in Fig. 3 may be applied, if the brake-mechanism of Fig. 15 is omitted (Figs. 15 and 17).

My first object is to free the gear transmission from the motor and the vehicle (simultaneously with decreasing the engine speed) by means of two vacuum-operated clutches, or one vacuum-operated clutch and one one-way clutch.

My second object is to combine the first object with a vacuum operated pump controlled by a button from the steering wheel to shift the gears into low, second, and high gear simultaneously with the operation of said clutches, or right thereafter.

My third object is to connect the inlet manifold by means of an automatic valve with a vacuum reservoir, and to connect said reservoir with a control unit composed of two control valves, one being operated independently from the dashboard to connect and disconnect said vacuum reservoir with said vacuum operated clutches and vacuum gearshift, the other being operated simultaneously with the throttle so that said clutches are declutched, when the throttle is closed and in clutched position when the throttle is opened.

My fourth object is to construct the vacuum clutch in such a way that in declutched position the piston of the vacuum pump does not rotate against the inside of the flywheel, but against a separate cylinder wall rotating with the speed of the clutch shaft so that the piston and cylinder both rotate always with the same speed, or are at a standstill.

My fifth object is to connect the lubricating system of the engine with the lubrication of the main clutches and gear transmission.

My sixth object is to construct a gearbox in which at least one lower gear transmission is in constant mesh between the driving end and the driven end of said gear transmission, said lower gear transmission incoporating an overrunning clutch, which clutch actually overruns as soon as a higher gear transmission is effected in said transmission.

My seventh object is to shift the gears in said transmission by a fluid motor, said motor being controlled primarily by a manually controlled valve, said valve controlled by a second valve, by preference mechanically associated with mechanism to declutch one or two main clutches fore and after said gear transmission, to control by preference said second control valve by a third valve associated with the control of the prime mover in a vehicle, to control said third valve and said second valve or only said second control-valve by a fourth valve operated independently of said first three valves. Subcombinations of said valves are supposed to be included.

My eighth object is to place an intermediate control valve ($4j$) between the control button $21a$—$a$ and the control valves $5a$—$b$, and $6a$—$b$, actuated by the clutch pedal when the vacuum pumps have freed the gearbox at both ends.

Said second control valve by preference so made that it creates in a fluid motor, effecting the gearshift, a neutral condition after a shift, so that said motor does not pull on any gear or clutch in said transmission in any position after a shift is made.

My ninth object is to construct a gearbox, which allows solid drive in high, intermediate and low gear shifted by vacuum power, the low gear, neutral and reverse gear position for parking being preferably controlled by a gearshift lever.

My tenth object is to control the operation of the automatic gearshift independently of the valves controlling the automatic operation of the one or two main clutches $7$ and $9$ (see Fig. 18).

My eleventh object is to provide the control valve $4j$ between the inlet manifold $I$ and the fluid motor $15$ for gearshifting with an atmospheric opening $4m$ which allows air to enter in the fluid motor $15$ on that side of the piston where there was vacuum, when the control valve $4j$ established connection between manifold and fluid motor $15$, that is when the main clutches have freed the gearbox from both ends, and have connected it again at both ends, when the foot-pedal $22$ returned again to normal position. Said control valve is further provided with a horizontal airhole $4m$—$m$, to prevent a vacuum to the right of cylinder $4i(ai)$ when the piston $4i(ai)$ moves to the left.

Referring to the drawings, Fig. 1 shows the general outline of an automatic gearshift by means of two main clutches freeing the gear transmission from both ends, the motor-end and vehicle-end, a vacuum fluid motor shifting gears in said transmission, four or five (as shown in Fig. 15C), control valves between the inlet manifold of an internal combustion engine and said vacuum fluid motor. The clutches, fluid motor, gear transmission are shown in longitudinal, vertical, cross section, and also the first two control valves 5 and 6, the other two being shown in enlarged cross section in Figs. 2B and 5-10, and a fifth valve in the flywheel being shown in Fig. 2A.

Fig. 2 shows Fig. 1 on the section line S2, and is a top view of a horizontal section of the gearshift lever just above the gearshifter shafts in the gearbox, and the fluid motor shifter shaft 14a of the vacuum fluid motor 15.

Fig. 2—2 shows a modification of Fig. 2.

Fig. 2A is vertical cross section of an automatic valve 7i (Figs. 1 and 3) in the flywheel to control the rate of the escape of air from the space between the flywheel chamber and the vacuum fluid motor therein.

Fig. 2B is a vertical cross section of the valve 4j, between control valve 6, and control valve 21 (see Fig. 1).

Fig. 3 shows a vertical section of one type of gearbox, which can be used together with the shifting arrangement of Figs. 2 and 2—2, and represents the gearbox of Fig. 1 in detail.

Fig. 3A shows the various gear positions of the shifter shafts 30a and 60a, considered from the top end of the gear lever 13, or considered from the lower end thereof 13h.

Fig. 3C shows the positions of the lever 21a—a on the steering wheel, operating on the control valve 21, to effect the corresponding positions of the gears on the shifter shaft 30a, or on shifter shaft 30a and 60a both.

Fig. 3B shows a vertical cross section on the line S3B of Fig. 3 of the overrunning clutch 54 in the gear wheel 36.

Fig. 4 shows a vertical, longitudinal cross section of the clutch 7 of Fig. 1 and the connections with the vacuum line and clutch pedal, and shows the clutch 7 of Fig. 1 on a greater scale.

Fig. 5 shows a vertical cross section of the valve 21 of Fig. 1 together with the four vacuum-air pipe connections.

Fig. 6 is a horizontal cross section of Fig. 5 on the section line S6.

Fig. 7 is a horizontal cross section of Fig. 5 on the section line S7 when the piston 21a is in the position of Fig. 9.

Fig. 8 shows a vertical section of the piston 21a of Fig. 5 when passage 68 is moved exactly out of communication with pipe 17, the positions of the four connections being indicated on opposite sides of this piston with horizontal lines.

Fig. 9 shows the position of valve 21a, when communication is established between pipe 4n and pipe 18—19.

Fig. 10 shows the position of valve 21a, when communication is going to be established between pipe 4n and pipe 20.

Figs. 11-13 show the fluid-motor having a piston 15 and a cylinder 16 with its connections 17, 18—19, 20, and shows the three positions the piston 15 may assume in cylinder 16, when actuated upon by the control valve 21 and lever 21a—a.

Fig. 14 shows an intermediate position of the piston effected by lever 13 by hand. Fig. 14 shows further a modification of the fluid motor to provide a cushion of air for the piston 15, by means of two intermediate passage ways 17a and 20a.

Fig. 15 shows another type of gear transmission whereby the automatic gearshift obtains three forward gear transmissions in solid gear thereby eliminating the free wheel gear in low gear obtained in the arrangement of Fig. 3, which can be only eliminated by moving the gearshift lever in connection with the shifter shaft 60a.

Figs. 15A and 15B shows the various gear positions, for Fig. 15.

Fig. 16 in combination with Fig. 17C shows how the piston 21a in the control cylinder 21 may be operated visibly on the steering wheel to the three different gear positions top, low and intermediate position for Fig. 15.

Fig. 17 shows another modification of a gearbox, in which the gears are so located and arranged that the subsequent gear ratios are obtained with the lever 21a—a on the steering wheel by rotating it in the same direction, and when the gear lever 13 has to be used for parking purposes, the lever 21a—a has to be turned to the low-gear position.

Figs. 17A and 17B show the various gear positions considered from the top end and lower end of the gear shift lever 13, and Fig. 17C shows the corresponding positions of the lever on the steering wheel, 118.

Fig. 15C, Figs. 18 and 18A are modifications of Fig. 1. Also Fig. 18C.

Fig. 18B is another modification in which the operation of the fluid motor actuating the gearshift, is not controlled by a valve associated with the throttle operation of the motor in the vehicle, but is controlled by a valve operated independently of the throttle valve.

In Fig. 18C another variation is shown, in which the fluid motor effecting the gearshift is only controlled by the lever on the steering wheel by means of control valve 21, and in addition thereto by preference by the control valve 4j, associated with the declutching operation of one or more main clutches in the transmission from motor to the wheels of the vehicle. The fluid-motor actuation of the clutch or clutches, if any, may be eliminated by a valve 5a—b.

Fig. 19 shows that the shift rod for low and reverse is or may be controlled from the dashboard by a lever, having three or more positions, low gear, neutral and reverse gear. It also shows the modification to actuate the shift rod indirectly by an inside arm 13h and an outside arm 13h¹, as can be seen in Fig. 19A on a smaller scale, in top view.

Fig. 19A shows Fig. 19 on the section line 19A—19A in top view, and Fig. 19 shows Fig. 19A on the section line 19—19 in side view and partly in longitudinal section through the top part of the gearbox. In Fig. 19 shift rod 30a is in second gear position, while in Fig. 19A both shift rods 30a and 60a are shown in neutral position.

Fig. 20 shows diagrammatically the arrangement whereby the motor is automatically started when the internal combustion engine stops working. The clutch pedal, like in the automatic gearshift, controls or starts the electric starter in disengaged position, but the actual electrical circuit is made by an apparatus called startix and explained hereafter in detail. The startix closes the current when the internal combustion motor stops and only in that condition has the movement of the clutch effect.

Fig. 20A shows another arrangement thereof, which is in essence equivalent to that of Fig. 20, the actuation of the electric starter being dependent again on the automatic closing of the circuit by the said startix arrangement.

Fig. 21 shows a modification of the splines of the construction of the gearboxes of Figs. 15 and 17 especially. Helical splines are in the construction of Figs. 15 and 17 imperative, if the gears are helical.

Fig. 22 shows the gearbox of Fig. 15 provided with a two-way clutch in the rear instead of a one-way clutch, as shown in Fig. 15.

The rest of Fig. 15 including the brake on the clutchshaft 7d are supposed to be a part of Fig. 22, it being superfluous to show the other details of the gear transmission of Fig. 15. It shows further that the shift fluid motor or cylinder 16 may move the shift rod horizontally by means of ball and socket joint and lever 30c, as shown in horizontal section in top view in Fig. 22A, on the section line 22A—22A of Fig. 22.

It is understood in Fig. 22 that only one of the main clutches may have the fluid motor of Fig. 3 constructed in it. Or both main clutches may be operated by a servomotor located outside the clutch, like the servo-motor for the gearshift besides the gearbox 8. The servo-motor inside the main clutch itself is only a new and preferred construction, the principle of both being the same.

Fig. 23 shows a combination of some of the features of Fig. 3 and some of Fig. 17. The shiftable unit for low and reverse controls at the same time in reverse the neutral positions of the high and second gear, even if they were left accidentally in gear by the automatic gearshift. This arrangement may also contain the overrunning arrangement for the lowest gear in order to effect three gears forward corresponding to the 3 positions of the piston in the single shift cylinder. This latter arrangement being first explained in connection with Fig. 3.

Fig. 23A shows that in this arrangement the shift from the dashboard needs only three positions, low, neutral and reverse, the neutral position being the standard position for the automatic shift for high and second gear.

Figs. 24 and 25 show a pendulum arrangement in order to readmit atmospheric pressure gradually on that side of the piston of the servo-motor for the main clutches, where was partial vacuum before.

Fig. 24 is Fig. 25 on the section line 24—24 and reversely Fig. 25 is Fig. 24 on the section line 25—25.

Likewise Fig. 22 is Fig. 23 on the section line 22—22, and Fig. 2A shows Fig. 22 on the section line 22A—22A.

In Fig. 1, 1 is the inlet manifold of an internal combustion engine, in which the reciprocating pistons create a considerable partial vacuum at idling speeds. 2 is an automatic valve between the inlet manifold and a vacuum chamber, said valve opening only towards the manifold when the vacuum in the manifold is greater than in said reservoir at any given time. This valve may be a ball-valve or any other valve opening towards the manifold when the suction therein is greater than in the reservoir 3 and closing towards the reservoir when the pressure therein is less than in the manifold. It is emphasised that I place said valve in perpendicular position. In that position the accelerations and decelerations of the car do not affect the function of this valve, but the gravity will tend to close the passage between the manifold and the tank 3. And in that position if the car is inclined on a hill, or declined, the position of the car will not affect this valve. Therefore this particular position is of the utmost importance. 3 is the reservoir of a volume in proportion to the displacement of the fluid motors to be used for operating one or two clutches, and a fluid motor to operate the gearshift. 4 is a pipe leading to a double control valve, the upper one 5a—b being operated from the dashboard to open or close said vacuum line 4, and cooperating with a second control valve 6a—b, opening and closing said pipe-line, being connected with the accelerator (or throttle pedal). Both of said control valves consist of a cylinder by preference at right angles to the vacuum line 4, and pistons which have ports 5a and 6a respectively transverse to the axis of the vacuum pipe-line, in order to establish the vacuum connection between the line 4 and 4a, and further have recesses or ports 5b and 6b in order to let the atmospheric pressure into the clutch fluid motors 7 and 9 and the gearshift fluid motors 15—16.

The vacuum-atmospheric line 4a on the other side of said double control valve splits itself into two such lines, one 4b going to a rubber pipe 4c, connected with the vacuum-atmospheric duct 4d in the pressure plate-piston of clutch fluid motor 7c, the other 4h going to control valve 4j and further to control valve 21 and further to the gearshift fluid motor 15—16. The line 4b leads, before connecting with line 4c, to a branch 4e connecting equally with a rubber pipe (or flexible pipe) 4f to the vacuum atmospheric duct 4g in the pressure plate-piston of the clutch fluid motor 9c.

The line 4h preferably connects first with a control valve 4j operated by the foot-clutch pedal lever 22 (operating also the front and rear-clutches) by means of the connection 4i. This control valve 4j is shown in its details in Fig. 2B, having a piston 4k with an intermediate waist 4l. When the clutch pedal 22 is either depressed with the foot, or moves forward on account of the equivalent action of the manifold vacuum on the pressure plates of the clutches, this waist or intermediate portion establishes the connection between the inlet manifold and the next control button 21 by means of the pipe 4n between these two latter control valves. The control valve 21 connects to the left with pipe 4n and to the right with three pipes 17, 18—19, 20 connected with a fluid motor 15, the operation and results of which will be described later in connection with Figs. 5–14. The pinion 15 of this gearshift fluid motor is connected by means of a rod 14 in Fig. 2 indirectly via the lower end of the gear shift lever, 13h to the gearshift lever 13, which has its fulcrum at 13b. On top of this lever is a button and rod 13a connected with a sliding member 13c below said fulcrum 13b (see Fig. 3). This member 13c has two extensions 13d and 13f, cooperating respectively with two abutments 13e and 13g located and adjustably attached to the gearbox.

When said button is not depressed it is possible to shift backwards into freewheel low-gear position and forwards into neutral position. The abutments 13e and 13g effect the accurate position of the gear clutch 40 (see Fig. 3) for said two positions.

When said button is depressed and the lever 13 shifted more forwards to extreme forward position, reverse gear is obtained, and when the lever 13 is moved backwards to extreme backward position, solid drive in low is obtained. when it is desirable to eliminate the freewheel action in low, when descending a hill, or when the freewheel action is not reliable at first on cold mornings, or to use solid gear in traffic for extreme low speeds.

The lowest end of said lever 13, is 13h and connects either with a shifter button 30 on the gear shift rod 30a for high, second and low gear, or with a shifter button 60 on the gear shift rod 60a for low-gear-solid-drive and freewheel, or for neutral and reverse gear position.

The clutch pedal 22 has a fulcrum at 23 and operates with the lower end thereof 24, having a fork, on a clutch ring 25, in which an airduct (see Fig. 4) is also connected with the vacuum line 4c. Above said fulcrum, said lever 22 is connected movably with a rod 26, which is again connected with a lever 27 having a fulcrum at 27a, and operating with a fork 28 on a clutch ring 29 to declutch the rear clutch in the same way as lever 22, 23, 24 declutches the front clutch. By this arrangement both clutches may be declutched substantially simultaneously by foot pressure.

Number 8 in Fig. 1 represents the entire gearbox, all of the gears are in constant mesh with each other, four pairs, of which three gears of three pairs are rotating freely on the main shaft 61. The details and numbers of this gearbox are shown in Fig. 3.

In Fig. 2 a top view of the shifting gear lever 13 above the shifting rods 30a and 60a is shown and the connection with the gearshift fluid motor 15 by means of the lower end 13h of the gearshift lever 13, allowing a fixed distance between the various positions of the gear clutches and the piston 15 in the fluid motor. In Fig. 2 the vertical plane of the axis of the fluid motor 15 is midway and in the same plane horizontally as the gearshift rods 30a and 60a, so that said distances remain the same for the outer and intermediate positions of said shifter shafts. In this arrangement the lower end of the gearshift lever 13h has to be shifted from one socket 30 to the other socket 60 on the other shifter shaft (gearshift rod) in order to allow the fluid motor to shift the gear clutches connected with either shifter shaft.

But in so far the low and reverse gear are only of importance during parking possibilities, it is preferred to connect the shifter fluid motor only and directly with the shifter shaft for high and second gear and low gear freewheel as shown in Fig. 2—2. This arrangement has the advantage that for ordinary driving the gearshift lever does not have to be touched at all, but remains in the position above the left shifter rod and is not moved by the fluid motor 15—16. It has further the advantage that during the period of heating up the motor, when the throttle is so wide open that the port 6b prevents the operation of the fluid-motor-actuated clutches and fluid-motor-actuated gear shifter, the gearshift lever can be pushed backwards as far as it goes, (without depressing the button 13a on the gearshift lever 13) shifting thereby from the low-gear-position into neutral position (see Fig. 3).

The connection between shifter shaft 30a and the fluid motor 15 is shown in Fig. 2—2 permanent, and the rod 30a is merely continued to meet the piston 15 of the fluid motor. However, it is, of course, understood that this permanent connection may be equally effected with a leverage in between as shown in Fig. 1, in which the gearshift lever performs that leverage function. If only a front clutch is used, the shifter rod may be easily extended to meet about the axis of the fluid motor 15. However, some kind of leverage in between may be preferred, and should be preferentially at right angles to the gearshift lever 13, as shown at 30c in Fig. 3. The fluid motor 15 may then be placed also conveniently below the floorboard behind the rear clutch somewhere above or beside the propeller shaft 10—11. This fluid motor is shown beside the propeller shaft 11 in Figs. 19 and 22.

The gearshifting for a single rod 60a may be effected by a steel cable directly connected to 60a and controlled from the dashboard eliminating the gearshift lever entirely, and one has to rely entirely on the fluid motor 15 to do the shifting between high, low and second gears. The handle connected to the steel cable may have graduated notches on it, like on the shifting rod 30a in order to see and feel the exact positions of the shifting shaft 60a. This arrangement is shown in Fig. 19 of the sixth sheet. This flexible cable is shown at 60c, and the handle at 60d. This handle moves in a bracket 60e having a shifter-rod with notches (as shown at 60a in Fig. 3, which should be omitted for the arrangement here discussed) for reverse, neutral, freewheel-low gear, and freewheel-solid-gear position. For standard driving the handle is placed at the visible notch FL, and when neutral gear is desired the handle 60d has to be pressed in one notch further to N indicating neutral. The outermost positions of SL and R are felt, as the handle cannot be moved further either way. The neutral position however is seldom, if ever, required as will be explained later in connection with the automatic starting of the motor, and automatic declutching.

In Fig. 2A is shown the lower end of the flywheel clutch unit of Fig. 1, front clutch or rear clutch, and will be discussed in detail in connection with Fig. 4, showing the enlarged clutch unit.

Fig. 2B will be discussed in connection with Figs. 5–10. In Fig. 3 the shifter shaft 30a moves the gear and synchromesh clutches associated with the shiftable unit 43, and the shifter shaft 60a is associated with the gear clutches for the shiftable unit 40. The clutch shaft 31 has a gear 31a-a in constant mesh with gear 32 on the countershaft, rotating by preference on a fixed shaft 62. In the clutch shaft 31, is anchored the main shaft 61, having splines on the outer left end and adjacent thereto a smooth surface to provide a bearing for the freely rotating gear 34, in constant mesh with the countershaft gear 33. A gear 35 on the countershaft is in constant mesh with a freely rotating gear 36 on the mainshaft incorporating a free wheel or overrunning clutch mechanism 54, and finally a gear 37 rigidly connected with the countershaft meshes a freely rotating gear 38 (on a shaft behind the countershaft as in standard constructions), which is again in constant mesh with a gear 39, freely rotating on the main shaft 61.

On the gears 31 and 34 are respectively two clutch gears 41 and 45 and beyond those, two conical surfaces 46 and 48 respectively, which engage two corresponding conical clutch faces 47 and 49 on a member 44 splined to the shaft 61. The member 44 is splined around the outer periphery thereof, and a ring 43 is splined internally or rather geared internally, 43c, to cooperate with the outer splines or teeth on the member 44. In the latter member 44, are radially arranged plungers, activated outwardly by springs, 43b, to press the upper ends of said plungers, or balls located on top of said plungers, into a circumferential groove 43a in the member 43, so that said springs hold said two members 43 and 44 in semi-rigid position to each other. When the shifter fork 42, is moved to the right, the outer member 43 carries the inner member 44 with it, until the conical surfaces 48 and 49 meet each other. When the resistance offered is smaller than the force exerted on the gearshift lever by hand, or by the fluid motor, the outer member slides the groove 43a over the balls 43b, pressing them inwardly, and the member 43 slides upon the gear clutch (gear teeth) 45 of the gear 34 for second gear. Equally if the member 43 is shifted to the left by hand or by vacuum, the teeth (splines, gears) 43c engage the gears 41 on gear 31, after the clutches 46, 47 have synchronised the gears 43c and 41, for high gear.

In the gear wheel 36 is a one-way clutch of the cam and roller type, as shown in transverse section on a smaller scale in Fig. 3B below Fig. 3. The ball bearing 55 centralises the inner ring 54c of said clutch with respect to the outer ring 54d. The inner ring 54c rotating freely on the smooth bearing 53 on the shaft 61, has a plurality of cams with a circular surface, having a center outside the axis of this clutch. Each of said cams has a roller between it and the smooth circular inside surface of the outer member 54d thereof. Between the rollers are intermediate springs at 54a, g, f, e and intermediate filling pieces 54d between those rollers, which do not have intermediate springs. The latter springs are preferentially located between filling members having concave parts fitting the adjacent rollers, while the filling members 54d have such concave parts on either side. When the outer ring is rotated clockwise it pinches the rollers 54 between the inner ring 54c and the outer ring 54d, and when rotated counter-clockwise the rollers are freed and the motor is freed from the rear wheels. When the gear clutch 59 of the shifting unit 40 is shifted into mesh with gear clutch 60a, the gear clutches 58a on unit 40 and 58 on the inner ring 54c are out of mesh, otherwise the reverse gear would rotate shaft 61 and inner ring 54c counter-clockwise, which would pinch the rollers 54 between 54c and 54d.

The reverse gear 39 is by preference connected in constant mesh with idler gear 38 which meshes with the gear 37 on the countershaft, to reduce the shifting space to the same minimum space as is necessary for the shift from the intermediate position of shifter bar 30a, which is low gear, to high gear or to second gear.

In Fig. 4 is shown in detail the clutch 7 of Fig. 1. 7 is the flywheel plate connected to the crankshaft 7'. 7a is the clutch disc having two faces of frictional material, and splined upon clutch shaft 31. 7b is the pressure plate, which is at the same time the piston of the fluid motor 7c, the cylinder of which is formed by 7d. 7e is the air space around the fluid motor 7c in the flywheel housing, formed by the flywheel plate 7, outer ring 7h, with teeth for starter, and cover plate 7j. The latter three parts are preferably built up by bolts 7k. On either side of the cover plate 7j is a ball bearing respectively 7f and 7g to take up respectively the pressure of the clutch springs 7l and the vacuum created in 7c. The member 7d—d is screwed upon the shaft of the vacuum cylinder 7d to adjust the play of the bearings 7f and 7g between the plates 7d and 7j.

The fluid-motor disc-pressure plate 7b extends to the right around the cylinder extension of the disc plate 7a, and has a vacuum-airduct 4d therein, which connects with a radial airduct on the inside of the clutch ring 25, which connects further with the airduct 4c as explained. When the control valve 5 is pushed in (normal working condition of this automatic gearshift) and the control valve 6a connected with the accelerator is in idling position, the vacuum of the motor pulls the plate 7b towards the fluid motor cylinder back wall 7d and compresses the clutch springs 7l, and the clutch disc 7a is released from the pinching action between flywheel plate 7 and pressure plate 7b by eliminating the action of the springs 7l. This action moves the foot clutch pedal 22 backwards without the pressure of the foot.

The same action is substantially simultaneously obtained in the rear clutch via the rods 26, 27, 28 and ring 29, and also by the vacuum suction obtained in the vacuum fluid motor 9c of the rear clutch in the same way as in the front clutch with substantially the same parts and construction.

The propeller shaft 11 is connected via a universal joint 10 with the clutch disc 9a of the rear clutch unit 9.

In Fig. 5, 21 is the cylinder body of the control valve 21, having a piston 21a therein. Inside said piston is a hollow rod 21b with an air passage 63, the upper end of which rod extends outside the cylinder 21, into the control knob 21a—a. The central air passage 63 extends upwards and sideways into an exit 64 as shown in horizontal cross section in Fig. 6. This piston 21a has also an intermediate waist 68, communicating constantly in all positions of the valve 21a with the vacuum-air line 4n. At the lower end of said piston is an air hole sideways, 67, similar in width and position to air hole 64 at the upper end of the piston. The right side of the cylinder 21 is connected with four pipes, which connect respectively with the left hand side, intermediate part, and right hand side of the piston fluid motor 15 as shown in Figs. 11–13. These pipes are successively numbered 17, 18, 19, 20. Pipe 18—19 being merged at the body 21 of the control valve 21.

Fig. 6 is a horizontal cross section of valve 21a on the section S6 of Fig. 5, and Fig. 7 is a similar section thereof on the section line S7 thereof, showing clearly the communication between the vacuum line 4n and the respective pipes 17—20. The pipes 18—19 are merged into a single pipe between the fluid motor 15—16 and the control valve 21, preferably close to the cylinder 16, as shown in Figs. 11–14.

Figs. 8, 9 and 10 show respectively the three available positions of the piston valve 21a. In the position of Fig. 5, up to the position of valve 21a in Fig. 8, the vacuum from 4n communicates with the left side of the piston via pipe 17 and the piston is pulled to the left as air enters through pipe 20 via the hole 62 in the bottom of the cylinder 21 and hole 67 in the valve 21a. When the piston 21a is depressed up to the position shown in Fig. 8, the vacuum pipe 4n is connected with the pipe 18—19, and this connection includes the position of Fig. 9 up to the position of valve 21a in Fig. 10. The piston 15 being in the position of Fig. 13 starts to be sucked to the right by the combined action of the suction in pipes 18 and 19. In the position of Figs. 8 and 9, a little stream of air trickles through pipe 17 to the left of the cylinder, through the air hole 65, which is only so great that a similar air leak to the right of the piston via air hole 62 and 66 and pipe 20 is not sufficient to interfere seriously with the vacuum power to the right of the piston 15 to move the piston 15 to the right. The air, however, trickling via 62, 63, 64, 65 into pipe 17, is sufficient to prevent a strong vacuum being created to the left of the piston 15, said piston moving to the right.

When the piston 15 begins to cover up pipe 18, the air trickles still in through pipe 17 and pipe 19 is still sucking the piston to the right, as the air through pipe 20 is not sufficient to break the vacuum through pipe 19. As soon as the right edge of the piston 15 begins to cover up the pipe 19, the piston 15 remains stationary as pipe 18 starts to be uncovered again as soon as or before (slightly) pipe 19 is covered and sucks the piston back, or anyway 18 stops any further movement of the piston 15.

When the valve 21a is pressed below the position of Fig. 10, the vacuum from 4n is continued through 68 and pipe 20 to the right of piston 15, and air streams in full quantities to the left of the piston through pipe 17 via passage 62, 63, 64.

These three piston positions correspond with the three positions shown in Fig. 3, for the shifting rod 30a for high, low, and intermediate speed.

Fig. 14 is a modification of the fluid motor 15 which serves to brake the piston more efficiently when moving to the right and to the left. At the outer ends of the cylinder 16 are made two air passages, the ends of which both communicate with the inside of the cylinder surface and these ends are located at such a distance from each other that the piston 15 when located exactly between them just clears them both. The left end of this left air passage 17a is exactly to the left of the plane of the pipe 17, perpendicular to the axis of the fluid motor 15. The right end of this right air passage 20a is also exactly to the right of the plane of the pipe 20, perpendicular to the axis of the fluid motor 15. When the pipe 17 has a vacuum and the piston 15 moves to the left, it covers up at a certain position the pipe 17 and clears the two ends of the passage 17a so that the air rushing in through pipe 20 to the right of the piston 15, streams through said passage 17a to the left of the piston 15 also and builds up there a layer of air to prevent the piston from striking the left wall of the cylinder 16. When the piston 15 covers up the pipe 17, a vacuum is left to the left of the piston and the amount of air may not be sufficient sometimes to prevent the piston from striking the wall, unless the buffers 14c and 14d of Fig. 2—2 are used.

When the piston 15 has to move to the right, the vacuum to the right of piston 15 creates ordinarily enough suction to draw the piston to the right over the critical point between the two ends of the air passage 17a, as the piston closes up the left end of passage 17a by the inertia of its momentum going to the left.

The same conditions obtain on the other side of the cylinder for the air passage 20a opposite the pipe 20. When there is a vacuum created in pipe 20, the piston 15 moves to the right and air enters through pipe 17 as described for Fig. 1.

However, it may be preferable for various reasons as space and speed of shifting to construct another type of brake for the piston 15 by mounting two buffers of rubber 14d on opposite sides of a button 14c attached to a stationary element of the car and located around the connecting rod 14 between the fluid motor 15 and the shifter shaft 30a, as shown diagrammatically in Fig. 2—2.

The cooperation of the various parts described is as follows, using Fig. 1 as a basis and the Figs. 2 to 14 explaining the details of the construction. Before the motor is started by means of the teeth 7h on the flywheel, the gearshift lever is placed in neutral position by moving it to the left and forward as in standard construction (see Fig. 3A). When the motor is heated up enough to idle, the lever 21a—a in Fig. 3C is placed on L and the button 5 is depressed so that the suction of the idling motor may operate through passage 5a and 6a upon the fluid motors in the clutches, freeing the gearbox from both ends. The gear lever is then moved from neutral backwards into low gear freewheel position by connecting the gear clutch 58a with the gear clutch 58 as explained and it is left there during driving conditions. By stepping on the accelerator 6, the passage 6a is blocked and the air enters the clutch fluid motors via air passage 6b, pipe 4a, 4b, 4c, 4d into the fluid motor, allowing the clutch springs 7l to pinch the clutch disc between the flywheel 7 and the pressure plate 7b. The car moves forward and when enough speed is acquired, the accelerator is released and the vacuum frees again the gear transmission from both ends. The clutch pedal 22 moves forward and moves the piston 4k in Fig. 2B in such a position that the vacuum through line 4h may continue past valve 4k into pipe 4n, and then to control valve 21. The control button 21a—a is either pressed down by the heel of the left foot clear to the bottom as far as it goes, or the lever 21a—a on the steering wheel is placed on S moving it to the left from the intermediate position L, where it was when starting. The accelerator is depressed and the car gains speed in the same way as explained for low gear, the control valve 21 having placed the piston 15 clear to the right as shown in Fig. 11, having moved it from the intermediate position shown in Fig. 12. The gears 43c and 45 are now meshed by means of the synchromesh action of the clutches 48, 49 as described. When the speed is sufficient in second gear, the accelerator is again released, the gearbox is freed, the clutch pedal moves piston 4k in control valve 4j, the control valve 21 is actuated, and the lever 21a—a on the steering wheel may be moved or is already moved to the right to H, or the control button 21a—a operated by the heel of the left foot may be entirely released (or is already entirely released before the accelerator is released).

When releasing the accelerator 6, the gear transmission stays on high, and when approaching a stop signal, all one has to do is to place the lever 21a—a on L (or depress it so much with the heel of the left foot that the valve 21a is somewhere between top and bottom position, both of which can be felt very distinctly). When one steps on the accelerator, one can place the manette 21a—a in advance on S or H, from low or reversely as the drive of the motor pinches the gears so much upon each other that the fluid motor 15 could not move them, the valve 4j—k preventing moreover positively the vacuum to change the gears until the accelerator is released again, which frees the gearbox and frees next the valve 4j—k so that the control valve 21 (=21a—a) can move the gears as it already intended to do according to its new position. This arrangement makes the gear shifting not only positive, but quick, and one can decide in advance which gear drive is going to be used next, which then depends upon the next release of the accelerator 6.

When approaching a parking place, all one has to do, is to place the manette on L (low gear), and to shift the lever 13 from solid low gear into reverse gear (by depressing button 13a on the lever 13) as in standard transmissions.

This operation applies to the construction of Fig. 2-2, in which the fluid motor 15 works directly on the shifter shaft 30a for high, low and intermediate speeds, or on the construction of Fig. 2 for all forward driving.

When the construction of Fig. 2 is applied, one has to move the lever from the right to the left (sitting in the car above the shifter shafts so that shaft 30a of Fig. 2 is the right shaft and shaft 60a the left shaft) when one wants to park and the control lever 21a—a on the steering wheel has to be placed on L, (as in the construction of Fig. 2-2) and the button 5 pulled out to place the fluid motor 15 out of operation, for parking purposes, during which it is preferred to operate the clutches by the left foot and shift the two gears low and reverse by hand by the lever 13, instead of by the fluid motor 15 (the lever 13 moves now the piston 15 in the fluid motor back and forwards).

In the construction of Fig. 2-2, the button 5 can be left untouched, as the manette 21a—a on the steering wheel keeps the shifter shaft in such a position that high and second gear are out of operation, and the gear lever being free of the fluid motor 15 does not have to move the piston 15, while in the construction of Fig. 2, the gear lever 13 works always in unison with the piston 15. In the latter case one could leave the control valve 5 in operative position and shift the gear lever 13 in addition to the manette 21a—a moved to the left for reverse gear and to the right for low gear in solid drive position, but this is too complicated and in so far it is desirable to do parking with the foot clutch pedal 22, it is preferred that the button 5 puts the fluid-motor-actuated clutches and fluid motor 15 out of operation.

To regulate the engagement of the clutch as accurately and progressively as possible, it is preferred to construct a control valve 7i in the periphery of the flywheel member 7h, as shown in Fig. 2A. The more the accelerator is depressed, the faster the flywheel rotates, increasing the centrifugal force. This force throws the valve 7o outwards against the tension of the spring 7r. The lower end of the valve ends in a point 7o, and tends to decrease the opening between this point and the air hole around it. It is preferred to close the exit of air from space 7e, around the vacuum clutch 7c, entirely by seating the valve end 7p, the mushroom end, on its seat, instead of closing the escape of air entirely with the lower point 7o of the valve. The size or number of these valves depends upon the size of the clutch, the volume of 7c and 7e, the strength of the springs 7l, the number of clutch-discs 7a, and the tension of the spring 7r, and should be found experimentally. When the accelerator is closed, air can enter freely, allowing the vacuum to operate.

The space 7e is kept as airtight as is possible by sealing the rubbing surfaces between member 7j and 7d—d by inserting a packing between them at 7s. The bearings 7f and 7g may be constructed differently according to the type of clutch and dimensions desired and should be made so that the escape of air from space 7e is as little as possible, and can be controlled by the valve 7i.

The bearings 7f and 7g may be lubricated from an oilduct (7t in 31) in the crankshaft 7' extending through the clutchshaft 31, and continuing through oilduct 61a in the mainshaft 61 to the release bearings of the rear clutch. The oil dripping from the bearings against the outside surface of the vacuum clutch 7d may be thrown against the inside surface of the annulus 7h by curving the outer ends of the outside surface of the cylinder 7d, as shown at 7m to prevent said oil substantially from reaching the rubbing surfaces of the members 7, 7a and 7b. Likewise the outer periphery of the cylinder 7d may be curved upwards at the outer ends as shown at 7n in Fig. 2A.

The cylindrical extension to the right of the disc plate 7a is splined upon the clutch shaft 31, having a bearing in the crankshaft 7. The pressure plate 7b rotates freely upon said cylindrical extension of 7a (or may be splined thereto for construction of Fig. 15). The cylindrical extension to the right of the cylinder 7d of the clutch fluid motor may be splined (see dotted line 7u) upon the cylindrical extension of the pressure plate 7b, that is the piston of this clutch fluid motor, if so desired. However the friction between the cylinder 7d and the cover plate 7j is so small that these two parts will move very little against each other. However, if the construction of the release bearings is dispensed with for reasons of economy or of construction (f. i. to make the air chamber 7e as tight as possible to improve the operation of the escape valve 7i) plain bearings may be used. To make the pressure plate 7b airtight some kind of elastic, porous material on the periphery is preferable and this should not wear out. The lubrication of this piston is as little as possible, therefore also they should rotate under any circumstance as a unit. When the vacuum operates, ring 25 rotates without pressure on 7b, only when foot pedal 22 is used, there is pressure and friction.

In so far the gear transmission of Fig. 3 has a freewheel for low gear, which can be eliminated by the gearshift lever 13, when it is desired to use low gear as a braking power, it may be preferred to have three solid gears forwards, which are all three controlled throughout by the control valve 21. In Fig. 15 is therefore shown a modified gear transmission, in which four forward speeds are obtained and one reverse speed. The fourth speed is an extreme low gear for emergency purposes and operated only by the gear lever 13.

In Fig. 15, 7 is the flywheel, and the clutch ring 25 moves the pressure plate 7b to the right when the foot pedal 22 is depressed or the vacuum of the inlet manifold operates the fluid motor 7c. On a cylindrical extension of 7b is splined a brake element 69, and a stiff spring 69a between 69 and 7b. When 7b is moved to the right this male brake element meets a female brake element 69b attached rigidly to the gearbox. Before the member 7b reaches its outermost position to the right, these two brake elements meet and stop the entire gearset, as member 7b is splined to 7a via splines 7v (see splines 7v dotted line) and 7a splined to clutchshaft 31, and gear 70 is a part of shaft 31.

Gear 70 is in constant mesh with gear 71 on the countershaft, 72 with 73 second gear, but gears 74 and 76 low gear, are not in constant mesh with each other. An eventual fourth gear may be obtained through 77 in constant mesh with gear 78 on the countershaft. The reverse gear 79 is also preferably in constant mesh with the idling gear 80 on a separate shaft behind the countershaft 81a, and gear 80 is in constant mesh with gear 81 on the countershaft 81a.

On gear 70 is a gear clutch 82 to be meshed for high gear with the internal gear 75 of the low gear 74, and on gear 72 is a similar gear clutch 83 to be meshed with said internal gear 75 for second gear. In intermediate position gear 74 meshes with gear 76 for low gear. These three pairs of gears are operated by the piston fluid motor 15 exactly in the same way as explained for the three forward gears of the construction of Fig. 3, only with this difference that in the intermediate position the fluid motor 15 does not actually mesh gears in Fig. 3 but allows the freewheel for low gear to operate, while in Fig. 15 this fluid motor actually meshes gears 74 and 76.

The gears 70—81 included may be all helical gears and the splines 75 may be helical in that case, so that the gear clutches 82, 83 have to be helical also. The slant of the splines should be in the same direction as the slant of the external gears. This arrangement is shown in Fig. 21 on sheet seven. The gears 70, 74 and 72 (meshed respectively with gears 71, 76 and 73 on the countershaft, see Fig. 15) are shown with a helical thread, which is cut by the plane of the paper. The positive clutches 82 and 83 show helical dog clutches in side view, and the shaft 75a (around the inner transmission shaft 70a) has an external helical gear of the same pitch as said dog-clutches. The inside of the shiftable unit 74 has a helical gear fitting that of the external helical gear of shaft 75a. The helical pitch of these latter shafts 75a, 82, 83 should be approximately or exactly equal to those of the gears 74 and 76, so that the shiftable unit 74 can easily match the low gear and pass the low gear 76 on the countershaft to match either the high gear or the second gear. There may be some play between 74 and 82 and 83 causing a non-objectionable backlash. The easiest way to manufacture this assembly is to make all gears and splines with the same helical thread of the same pitch and depth, and make the play for the dog clutches somewhat liberal. The longitudinal thrust at the teeth of the gears 74 and 76 is balanced by the counterthrust on the helical splines, and the gears 74 and 76 for instance stay in mesh independent of the shifter arm 74a, shifting rod 74c and the lower end 13h of the gear lever, or independent of the exact position of the piston 15 in the fluid motor.

The shaft 75a rotates freely on the mainshaft 70a and extends to the right as far as the gear (or splines) 86 on the mainshaft 70a. In normal forward driving condition this shaft 75a rotates at the speed of the mainshaft 70a by means of the interlocking of the internal teeth 85 on the shifting unit 85 and the external teeth 86 on the shaft 70a.

The gear wheel 77 can be moved to the right and its internal gear teeth 85c may meet the external gear teeth 85b on the shifting unit 85 when placed in neutral position freeing the shaft 75a and thereby freeing the three pairs of gears in constant mesh from the mainshaft 70a.

The shaft 75a has external gear teeth on the extreme right end at 85a to be meshed with the internal teeth 85 of the shifting unit 85, which internal teeth are at the same time in mesh with the external teeth 86 of the shaft 70a, when the shifting unit 85 is in the extreme left position.

When unit 85 is shifted to the right, neutral position is obtained and when shifted to the extreme right position, reverse gear is obtained by interlocking the internal teeth of the unit 85 with the external gear teeth 87 of the reverse gear 79 rotating freely on the shaft 70a.

Back of the gearbox is shown a one way clutch as an alternative for the construction of Fig. 1, but it is understood that a two way clutch may be used here also. This gearbox of Fig. 15 with two two-way clutches is shown in Fig. 22, and the gearbox construction shown in Fig. 22 contains the brake elements 69 and 69b of Fig. 15. It is understood that where the brake elements 69 and 69b are used, that the synchromesh clutches of Fig. 3 become virtually superfluous, as all the gears are stopped or are so reduced in speed that they become superfluous. Therefore it is understood that the arrangement of Figs. 3 and 15 are substantially equivalent to each other, and Figs. 15 and 22 differ only in the type of rear clutch used. In Fig. 15 is used a freewheel, in Fig. 22 a two-way clutch. Further the brake-elements 69 and 69b may be used on the construction of Fig. 1, and the synchromesh clutches 46—47 and 48—49 may be dispensed with. Reversely if in this transmission these brake-elements 69 and 69b are dispensed with the shifting unit 74 and the gear teeth 82 and 83 have to be provided with similar synchromesh clutches as the gears may be still rotating when the fluid-motor wants to mesh the gears. For low gear however the meshing of the gears will then be slightly noisy once in a while, as the gears may differ in peripheral speed. However even in this case the action of the valve 4j-k will prevent the fluid pump 15 from making a gearshift before the gears are entirely free. As the accelerator 6 has further reduced the engine speed to a minimum the friction between the members 7d and 7j will reduce the rotational gears quickly to a minimum. Any other type of clutch brake, for instance as shown in my Patent 1,541,240 will do.

The one way clutch 89—90 is substantially the same as that used in Fig. 3 and Fig. 3B. The sliding unit 88 has external teeth 88 to mesh with the internal teeth 89 of the outer ring 89 of the freewheel clutch 90 to eliminate the action of the freewheel to use the engine as a brake. This sliding unit is operated upon by a shifting rod 88a, which is constantly forced to the left by the plunger and spring 88b. When shifting in reverse the arm 85d of the shifting arm 85a moving unit 85 eliminates the freewheel action simultaneously with meshing gears 85 and 87. However, the freewheel function may be eliminated independently of the gear lever 13 shifting in reverse gear, by a similar lever operating upon the shifting rod 88c in the same way as lever 13 moves the gears 74, 77 and 85.

In this gear transmission the shifting arms 74a, 77a, 85a move and slide upon an intermediate shifter rod, which is however stationary and located below the shifter shafts 74c, 77c, and 85c, which slide to the left and to the right when the lower end 13h of the gear lever 13 engages their corresponding notches 74d, 77d, and 85d.

When the additional gear 77, 78 is eliminated, three gears forwards are still left and the complete unit can be made considerably more compact, in the latter case two shifter shafts are used, in the former case three, as shown in Fig. 17.

In Fig. 15a is shown that the top end of the lever 13 has for the shifter shaft 74c (corresponding to 30a in Figs. 2 and 2-2) three positions without a neutral position. High and second are as in any other standard gear and low is intermediate. When neutral position is desired during the warming up of the engine and for parking purposes the gear lever 13 is shifted to its intermediate position for shaft 85c, which is neutral as in standard gear. When shifted to its extreme forward position, reverse gear is obtained as in standard gear. The construction of Fig. 2-2 is again preferred for this gearshift. When the engine is warming up, the gear lever 13 is shifted in neutral position, or when one is in a hurry and wants to shift in unison with the operation of the clutch pedal 22, he can do so by cutting out all action on the vacuum clutches and fluid motor 15 by cutting off the passage 5a and establishing the passage 5b. As soon as the engine is warm after driving a minute, the lever 21a—a on the steering wheel of Fig. 16 can be placed immediately in high, and the control button 5 being depressed, the fluid motor 15 keeps the car in high gear. (It is not necessary to depress button 5, but one can change the lever 21a—a together with or in advance of making the shift with the gear-lever 13 as in standard shifting. If there is already enough vacuum, when the engine rotates with more than idling speed (suppose the gas manette on the steering wheel is not in idling position) to move the piston 15 slowly and to disengage the clutches partially, the action of foot and hand on the clutch pedal 22 and gear lever 13 will cooperate harmoniously therewith, and it is soon noticed when the vacuum is enough to make an automatic shift by lever 21a—a.)

In Fig. 17 is shown another alternative, which can be used together with the construction of Fig. 2-2 and Fig. 1.

The clutch shaft 31 has a gear 95 in constant mesh with the countershaft gear 96 on the shaft 117 rotating on the shaft 116. Main shaft 109b has a bearing in the clutch shaft 31, on this main shaft is a shaft 109 freely rotating thereon, and having outside splines (or gear teeth), the latter meshing with the internal splines or gears of the gear wheel 97, shifted in and out of mesh with gear 98 on the countershaft. Gear 99 for low gear is in constant mesh with gear 100 on the countershaft, and rotates freely on the shaft 109. The reverse gear 101 is in constant mesh with gear 102, on an idler shaft, and 102 is in constant mesh with gear 103 on the countershaft 117.

Gear 95 has to the right thereof a gear clutch 106 to be meshed for high gear with the internal gear 107 of the shifting unit 97, moved by the shifter arm 104. Gear 99 has to the left thereof a clutch gear 110 to be meshed with internal gear 107 for low gear. Gears 97 and 98 provide when in mesh, second or intermediate gear. When the unit 97 is shifted to the right to obtain low gear, the unit 113, internally geared at 113, connects the low gear 99, rotating freely on the shaft 109, with said shaft 109b by means of the external gears 112 on gear 99, and the external gears 114 on the mainshaft both engaging the splines or gears 113a of the unit 113. When 113 is moved to an intermediate position, neutral gear is obtained and when moved entirely to the right reverse gear is obtained through gears 31—95, 96, 103, 102, 101.

Fig. 17A shows that for the shifter shaft 30a the positions of the top end of the gear lever 13, is gradually from extreme forwards to extreme backwards position of the lever 13, low, second and high gear for shifter arm 104. The advantage of this gearing above that of Fig. 15 is that the manette 21a—a on the steering wheel can be moved gradually from the left to the right and in reverse direction when going to a lower speed. Further when the brake 69—69 is dispensed with, the gears 97—98 will mesh smoother when shifting from high to second gear or from low gear to second gear and reversely, as the corresponding gears do not differ so much in relative rotational speed as between high and low in Fig. 15.

Synchromesh clutches as shown in Fig. 3 can be formed on the shifting unit 97 for high and low gear corresponding to the construction of Fig. 3. This construction is shown in Fig. 23. The synchromesh of Fig. 1 between high and second gear is applied as shown in Fig. 1, and the same synchromesh shift is applied between low and reverse gear, which shift is operated from the dashboard as shown in Fig. 19. The gears 31, 34, 36 and 39 of Fig. 3 have their equivalent in gears 95, 97, 99 and 101 of Fig. 17, and the gears 32, 33, 35 and 37 on the countershaft of Fig. 3 find their equivalent in the gears 96, 98, 100 and 103 of Fig. 17.

It is, of course, understood, that the shift by a fluid motor as applied on high and second gear, having a neutral gear in between, may be equally applied on the shift between low and reverse with a neutral position in between.

It is shown in Fig. 23 that the shiftable unit when moving to the left engages low gear and can engage low gear only when the shiftable unit 43 is, of course, in neutral.

When shiftable unit 40 is in neutral and shiftable unit 43 in neutral the entire gearshift is in neutral.

When shifting the unit 40 to the right into reverse, it frees the high and low gear from the shaft entirely even when these gears were left in gear accidentally, exactly as shown in the arrangement of Figs. 15 and 17.

When the unit 40 is operated from the dash as shown in Fig. 23A the standard position for the dashboard lever 60d is to leave it in neutral position, and standard driving is done by the automatic shift between high and low gear.

A variation thereof, equivalent to the arrangement of Fig. 3, is to place an overrunning clutch in the low gear 36, as indicated by dotted lines at 54. Now we have three gears forward one of which, the low gear stays in gear all the time even during an overdrive in high or second gear. When the unit 40 is placed in neutral, all gears are in neutral. The disadvantage of this construction is that low gear cannot be used as a brake. However it would be possible to cut off the ignition, switch into reverse and use reverse gear as a brake for very steep grades down hill.

When operating this gear, it is necessary to shift the gears as in standard transmission when warming up the engine, and to move the manette 21a' on the steering wheel in unison with the gear lever 13 or in advance, or the button 5 is pulled out to eliminate the vacuum action entirely, until the vacuum works perfectly, which latter method is preferred as being more simple.

When parking the gear lever is shifted as in standard transmissions backwards into low gear, intermediate in neutral gear and forwards in reverse gear. The construction of Fig. 2-2 is again preferred above that of Fig. 2, as the lever 13 is directly operable for parking without shifting it from the right to the left, from shifter shaft 30a to shaft 60a (here 104 and 105). The direction of shifting is only in one direction forwards and backwards, shifting only from one shaft to the other when low gear is reached in both.

In Fig. 17c is shown the preferred interconnection between the lever 21a' on the steering wheel, and the button 21a$^2$ above the floor operating directly on the piston 21a in the control valve 21. The leverage from the floor button 21a$^2$ to the valve 21 is by means of levers and fulcrums 21i, 21h, 21g, 21f. The latter arm has an eye 21d, which cooperates with a stop on the rod 21b, moving valve 21a. When the floor button 21a$^2$ is pressed clear down with the heel of the left foot the valve operates low gear, when slightly released intermediate gear is engaged and when entirely released high gear is engaged. The same positions can be obtained with the lever 21a' on the steering wheel and these two buttons or levers work with regard to each other in the same way as the gas pedal and the gas manette on the steering wheel, that is they operate independently of each other. When it is preferred to drive forwards in low or second gear a long while, it is easier to keep the proper gear working by the lever 21a' on the steering wheel. However, experienced drivers who keep the throttle open more than a minimum can dispense with the lever 21a' on the steering wheel entirely as the gears remain in the gear position obtained by means of floor button 21a$^2$, when idling-position is avoided, by the accelerator 6, otherwise high gear is always obtained automatically by taking the left heel off the floor button 21a$^2$.

In general the combination of the floor and steering wheel valve control 21a—a may be preferred, as the driving is learned in a few minutes and is not confusing, once it is understood that the positions of the lever 21a' on the steering wheel correspond exactly with those of the floor button 21a$^2$. If the gearshift is so constructed that low gear is intermediate between high and second gear as in Figs. 3 and 15, low gear is obtained by pressing the floor button halfway and placing the lever on the steering wheel exactly in the middle of the three positions.

When second gear is intermediate as in Fig. 17, the same intermediate positions of the two levers 21a—a obtains second gear.

The shifting for parking is in all the three transmissoins as in standard cars so that nothing has to be learned or unlearned.

In fact with the construction of Fig. 17 practically nothing has to be learned, except that the button 5 when depressed allows automatic shifting for all forwards speeds, and when pulled out standard shifting is obtained and the motor can be used as a brake. For parking the lever 21a' on the steering wheel has to be placed on the L, for low gear, and it has to be remembered to place the lever 13 in neutral when turning off the engine as in standard construction.

Figs. 18 and 18A are modifications of the present constructions. For instance the button 5a—b may be provided with a spring as shown in Figs. 18B or 18C so that the passage 5a is always closed unless the button is stepped upon (in which case it has to be removed preferably from the dashboard to the floor). The lever 21a' on the steering wheel can be moved on the letter indicating the gear to be used, one steps next on the button 5 and the gear change takes place automatically (in this case the floor button 21a$^2$ would have no raison d'être, as the left foot is already engaged in pressing the button 5).

Another modification is shown in Fig. 18, in which the pipe 4h, leading to control valve 4j, and then via pipe 4n to the control valve 21, is directly connected with the reservoir 3 (or manifold 1), so that the gearshift depends not upon the position of the control valves 5a and 6a directly, but only indirectly via control valve 4j, which is operated by the clutch pedal 22, the position of which depends again upon the operation of the valves 5a and 6a. The advantage of this construction is that the engine can be used as a brake by closing 5a from the dashboard or floor board position, and at the same time the automatic gearshift is still working when the foot declutches by means of the pedal 22. The desired gear can be obtained again in advance, the drive from the motor preventing a gearshift and the fact that the pedal 22 has to be depressed first by foot.

Another modification is shown in Fig. 18A, in which the pipe 4 from the reservoir 3 or directly from the inlet manifold 1, splits itself in two pipes one 4a leading via the two control valves 5a—b and 6a—b to the fluid-motor-operated clutches 7c and 9c, the other 4h leading only via the control valve 6a and control valve 4j to the fluid motor 15.

The advantage over the system of Fig. 1 obtained here is again that the automatic gearshift is independent of the valve 5a, so that when the control valve 5 eliminates the freewheel action via the two main clutches 7 and 9, and the clutch pedal 22 has to be used for a gearshift, the gearshift remains automatic and the gear desired can be chosen in advance.

Another fourth modification, in which the pipeline 4h is only controlled by the valve 5a—b and not by the valve 6a—b, is shown in Fig. 18B, the further connections being readily visualised in view of drawings 18 and 18a. In this case the gearshift is only automatic when the valve 5 opens the passage 5a, when operated from the dashboard or floor board. The result is that when passage 5a is closed and 5b opened, that the entire gearshift operation depends upon the action of the left foot on the clutch pedal 22 and the shifting of the gear lever 13 by the right hand. When the valve 5a is open, and the throttle closed so that passage 6a is also open, the gearshift is entirely automatic, but if the freewheel action by means of main clutches 7 and 9 is eliminated the automatic gearshift is eliminated as well. Some people may prefer this construction.

Another fifth modification is shown in Fig. 18C, in which the valve 5 controls only the fluid-motor operated clutch, but the gearshift is in constant communication with the manifold.

In any of these constructions of Figs. 18, 18A, 18B, 18C, the valve 4j may be interposed between the tank 3 and the fluid-motor-operated gearshift, or not. In case a mechanical freewheel is added back of the gear box as shown in Fig. 15, the admittance of the vacuum to the gearshift fluid motor takes place virtually after the overrunning action has started and the valve 4j becomes in that respect somewhat superfluous. It may be connected as stated with the accelerator and operated simultaneously with the valve 6a—6b, but likewise here the passage 6a effects operation of the overrunning clutch before the gearshift fluid motor operates because the throttle has started to close, slowing down the engine, and the valve 4j is superfluous besides the valve 6a.

If the valve 6a is in the position of Fig. 1 when idling, the vacuum would continue to operate on the gearshift every time the accelerator is closed to idling position, and for that reason when using a freewheel and no valve 4j connected with the two-way clutch (either manually or power-operated) it is preferred to prevent the fluid motor from pulling on the gearshift elements by means of buffers 14d on either side of a buffer 14c arranged on the rod 14 connected to the shift rod 30a as shown in Fig. 2-2.

The important difference between the Figs. 18 and 18C on one side and Figs. 18A and 18B on the other side is, that only in the first two figures the fluid motor of the clutch is controlled by the accelerator, or any other manual control. In Fig. 18A, the accelerator 6 controls simultaneously clutch and gearshift by valve 6a—b, and in addition thereto the clutch-fluid-motor can be eliminated from the control of the accelerator by the valve 5a—b and be made independent of the accelerator control. In Fig. 18B the accelerator controls only the clutch, but the valve 5a—b may eliminate both of said controls, and make them independent of the control of the accelerator 6 and valve 6a—b.

Therefore in Fig. 18A, the clutch may be manually operated and the gearshift power-operated at will, and in Fig. 18B, the clutch and gearshift both may be manually operated, if desired under certain traffic conditions. And it is, of course, understood that the manually operated valve 5a—b in Figs. 1, 18, 18A, 18B, 18C may be eliminated entirely. Therefore in all these four variations all possible arrangements are covered. Both clutch and gearshift may be simultaneously, or independently, power-operated or manually-operated. More possibilities do not exist.

The advantage of the valve 4j is that all gearshifts (without freewheel) can be made preselective, because, if applied on any arrangement, the gearshift can be chosen in advance and cannot be had unless the two-way-clutch has been declutched either manually or by power. If the function of this valve 4j were connected either with the gearshift lever or with the selector valve, the gearshift could not be preselective, because to make it preselective the final control of the shift has to be necessarily independent of gearshift lever or selector valve.

In Fig. 15C likewise I have shown two valves $4j^1$ and $4j^2$. The first valve $4j^1$ is again associated with the operation of the two-way clutch 7, and the second valve $4j^2$ is associated with mechanism to put a freewheel in and out of operation.

If only valve $4j^1$ were used, without valve $4j^2$, and the freewheel is operating, it stands to reason that the two-way clutch had to be disengaged manually or by power to let the vacuum operate upon the fluid motor associated with the gearshift. If the accelerator was brought in idling position and the vehicle overruns the motor, the gearshift would not operate by power unless the two-way clutch was disengaged.

Therefore to take advantage of the freewheel action to be able to make a shift without disengaging the two-way clutch, and controlling the gearshift only by valve 6a—b, valve $4j^1$ can be eliminated, but in that case if the throttle is brought substantially to idling position and the car does not overrun the motor the vacuum or fluid motor gearshift may try to make a shift and cause damage. Likewise, when the freewheel would be eliminated by the lever 88c, the fluid-motor of the gearshift would pull on the gearshift even when the two-way clutch is not operated upon and cause damage, and for that reason I prefer to eliminate the fluid motor of the gearshift by placing the valve $4j^2$ between accelerator valve 6a—b and the fluid motor of the gearshift, if the freewheel is eliminated by the lever 88c. But this valve $4j^2$ is not operated by the clutch as in Figs. 1, 18 or 18A.

If the gearshift has a fluid-motor operated two-way clutch, and a fluid operated gearshift, and a freewheel, both valves $4j^1$ and $4j^2$ can be used simultaneously, because if the transmission is freed from both ends the shift becomes easier whether synchronising means are used or not. Besides, if the freewheel is eliminated by lever 88c, it would have advantages also to eliminate the fluid-motor gearshift, if no synchronising means were used in the gearshift. If there are synchronising means it is usually sufficient to free the transmission at least at one end.

The advantage of automatic declutching and gearshifting in all forwards speeds lies in the fact that 97% of all driving is done in forwards direction. It further lies in the surety of operation, quickness and positivity of operation, which makes it very desirable for ordinary driving, under all conditions.

In the two latter constructions of Figs. 18A and B, it is preferred to have in the control valve 4j, as shown in Fig. 2B, an airhole 4m, which allows air to enter via waist 4l of piston 4k in valve 4j on either side of the piston 15 in the fluid motor. In case the automatic shifting is eliminated as may be the case in the construction of Figs. 1, 18A and B, and the gearshifting is done by hand via lever 13, air should be able to enter the pipe line 4n leading to control valve 21, otherwise, the lever 21a' on the steering wheel or the button $21a^2$ on the floor board has to be operated in unison with the gear lever, as otherwise the vacuum to the left or to the right of the piston 15 in cylinder 16 would seriously impede, if not prohibit gearshifting by the lever 13. In the construction of Fig. 18, this airhole 4m in the cylinder wall of control valve 4j, would be more or less superfluous as the vacuum power effects constantly automatic shifting independent of the automatic declutching, and if this vacuum power is not sufficient during warming up periods, it will not impede the shifting by lever 13 seriously. However it is preferred to use it also in the construction of Fig. 18, as the atmospheric pressure entering the chamber in which subatmospheric pressure was established during a gearshift, will prevent that the fluid motor will exert any pull on any gear or clutch in the transmission after a shift has been effected by said motor. If it is sufficient immediately on account of reservoir 3, the lever 21a' on the steering wheel can be used immediately. In this construction it is important to leave the lever 21a—a in low gear position when parking, and the same rule is imperative for the constructions of Figs. 1, 18A, 18B.

The advantage of the present automatic gearshifting is that it can hardly be abused. The double main clutches freeing the gearbox from both ends makes the gearshift positive and the control valve 4j prevents any gearshift on an improper moment or ineffective moment.

When passing dangerous points it is advisable to place the lever 21a—a on the steering wheel temporarily on low, so that the engine never can be stalled in the construction of Figs. 18 and 18A, and also in the constructions of Figs. 1 and 18B if the valve 5 is in normal position that is passage 5a open. When button 5a—b is operated by foot and provided with a spring as shown in Fig. 18B, it has to be depressed also. In case the gear transmission of Fig. 15 is used, it is preferred to connect the control valve 4j with a similar second control valve (as shown in Fig. 2B magnified) operated by the lever 88c used to place the freewheel 89—90 out of commission, as shown in Fig. 15C. When the one-way or two-way rear clutch is entirely eliminated, the clutch 69—69b is put out of function, and the gears to be meshed cannot be stopped, and therefore cannot be synchronised. Equally when the gear transmission of Fig. 3 with synchromesh clutches were used in the clutch arrangement of Fig. 15, that is a two way clutch between motor and gearbox and a one-way clutch, (which can be transformed in a two-way clutch by handle 88c) between the gear box and the wheels of the vehicle, it would be preferred to hook a control valve 4j up with the handle 88c, as the synchromesh clutches are less effective when the gears have to be synchronised according to the speed of the vehicle, which has to be done if the rear clutch action is eliminated. If the one way clutch 89—90 is put out of commission, the gearbox is freed by the front clutch from the motor, but the gearbox is still connected with the wheels of the vehicle.

In Fig. 15C it is preferred to connect a light arm 88b with the handle 88c, operating unit 88 in the gearbox of Fig. 15, near its fulcrum. This arm 88b has an eye through which extends the rod 4i of the piston 4k of the control valve 4j². When the lever 88c is pushed forward, the arm 88b lifts the rod 4j and the valve 4j² connects the two pipes 4n and 4n—n, which connects again with the control valve 21, as shown in Fig. 1 and Figs. 5–14.

In case the motor is provided with a so-called startix, an automatic apparatus to start the internal combustion motor with an electric motor (driven by the electric battery), every time the internal combustion motor stops, it is entirely superfluous to place the gearlever 13 in neutral at any time, as the reservoir 3 has sufficient vacuum left to keep the two main clutches 7 and 9 in declutched condition during the time the electric motor starts the explosion motor again. In fact if the vacuum fluid motor 7 (and 9) is made accurately and the connections are made well, the reservoir will keep the forward gears in neutral long enough for ordinary stops of a few minutes during which the motor does not run, and the gearshift lever does not have to be moved to neutral position. A short description of Figs. 20 and 20A will be given here. In the modification of Fig. 20, the clutch arm 22 closes the electric circuit of the motor by a switch 3e, and if the motor is dead, the spring 3d in the startix 3b has also closed the switch 3b. When the circuit that way is closed (the main manual switch being also closed, shown to the left of switch 3e), the starter motor does create a vacuum by rotating the motor, but the spring 3d is made so strong that this suction does not open the switch 3b, and this spring is so weak that when the engine idles, or starts with a sufficient throttle opening, the subatmospheric pressure is able to open the circuit compressing spring 3d and stopping the electric motor so that no damage to the automatic starting arrangement can take place.

If the clutch 22 is operated manually and the motor running, there would be danger that, if the throttle is open wide enough to decrease substantially the subatmospheric pressure, that the switch 3b would close and if simultaneously therewith the clutch would be manually disengaged the starter motor may be started when the motor is rotating fast. For that reason the vacuum tank 3 has special advantage because the switch 3b may be interconnected with this tank 3 instead of directly with the inlet manifold as shown in Fig. 20A. If the clutch is controlled by a vacuum motor, this tank, having a greater vacuum (valve 2), would immediately disengage the clutch and close the switch 3e, but the switch 3b would be still open.

In Fig. 20A the starter is engaged with the flywheel by means of an electric circuit, as is well known in the art, and this circuit is again controlled by the clutch and startix simultaneously in combination with the tank 3. In addition thereto I prefer to have the clutch pedal 22 control the conduit between tank 3 and startix 3b, after the clutch is disengaged and the switch 3e closed. If the tank has vacuum enough to break the circuit by switch 3b the starter motor cannot be damaged. If the tank 3 has not enough vacuum left to open the switch 3b, the starter motor will start. The tank 3 may be omitted in the arrangement of 20A, as shown in Fig. 20. If the clutch and/or gearshift are vacuum operated, the tank 3 is preferred, because it will keep the switch 3b open even after the engine has died.

When starting the motor again from cold one has to be only careful not to open the throttle unless the clutch is manually disengaged, or the gears put manually in neutral, as otherwise the main clutches are again engaged.

It is possible to construct the valve 21 so that the piston may be kept at one or two intermediate positions, as shown in Fig. 14 by means of one or two additional vacuum pipes attached to the cylinder 16 in the same way as the merged pipes 18—19. In that case the valve 21a has to be moved over a larger distance and much more accurately as for three positions as shown. This construction is only possible for the construction of Figs. 15 and 17 in which two neutral positions for the shifter rod 30a may be obtained between high and low and between low and second for Fig. 15, and between high and second and between second and low for Fig. 17, and it is only possible with the lever 21a—a on the steering wheel, which can place the valve 21a in its accurate place. The pipe 4n has to be brought in connection with four (or five) different lines, and it would be next to impossible to expect that a driver can sense the accurate position of the valve 21a—a on the floorboard.

It is understood that the double clutch arrangement of Fig. 1 gives a much smoother engagement between motor and car, when the accelerator 6 is depressed, than a single clutch and a one-way clutch, and it is therefore also understood that any other device may be applied on the pipe line 4a to regulate the amount of air, which is readmitted to the vacuum clutch to engage the clutch again. Such devices depend upon the principle of the inertia of a pendulum attached to the car and are well known in the art.

This arrangement is shown in Figs. 24 and 25 on sheet seven. The vacuum line 4b is connected with a pendulum arrangement at 120. This connection registers with a hole 121 in a transverse rod 120, having a bearing in the housing 119. Movably connected therewith is a pendulum 123, having a fulcrum at 122 on a shaft attached to the said housing. When the car is at rest, the pendulum assumes an almost perpendicular position as shown at 123 by a light spring 123a, and the hole 121 in the rod 120 registers with the vacuum line 4b and 4c leading to the fluid motor operating in the clutches (shown f. i. in Fig. 22). When the car begins to move the pendulum-hole 121 swings out of registry therewith and the atmospheric pressure or air admitted past the valve 6b (and, or, 5b) is either entirely cut off, or greatly restricted, so that the fluid motor from then on stops the engagement of the clutches. The slightest movement of the car affects this pendulum so that the main clutches are not yet entirely engaged when the car begins to move. Before the clutch(es) are entirely engaged this pendulum has made a few swings because successive grabbings of the clutch or clutches have caused an acceleration, which caused the pendulum to close the passage 121 and caused the spring 123a to again slightly open the passage 121 for air, after the pendulum has caught up with the acceleration of the car, and the pendulum has thereby admitted the air gradually and has thereby effected a gradual shift.

This pendulum arrangement in connection with a double two-way clutch effects a very smooth start and very gradual engagement during any gearshift, upwards or downwards.

It is to be noted that this arrangement varies from the standard arrangement on cars in which such a pendulum allows the air to escape from the other side of the piston operating the clutches. In my arrangement this escape is regulated by the valve 7q explained in connection with Fig. 2A. It is understood that Fig. 24 can be applied upon any servo motor to operate the clutches.

In connection with this pendulum, the application of the check valve 2 between the inlet manifold and either one of said vacuum motors for the clutch operation and gearshift operation is important.

If accidentally a belated or retarded ignition occurs in the engine (be it an explosive or Diesel engine), and the pressure suddenly rises in the inlet manifold (or source of pressure in general if it is connected with the operation of the engine as such) the check valve 2 will close immediately and not affect the gradual engagement of the clutch(es), nor affect the operation of the gearshift unfavorably.

It is shown in Fig. 18C that the operation of the fluid-motor-operated clutch(es) may be independent of the accelerator 6, line 4 being only controlled by the valve 5a—b, and the pipe line 4h may be connected with the reservoir or inlet manifold 1 directly, as shown in Fig. 18C, or line 4a and 4h may be controlled simultaneously by the same valve (see Fig. 18B). In this construction of Fig. 18B, however, the accelerator 6 has to open port 6a simultaneously with this valve 5a—b and the burden thereof comes on the driver. In Fig. 18C is shown that the fluid motors of the clutches may be operated independently of the throttle, and if the main clutch or main clutches are declutched, the fluid motor for the gearshift will work immediately, as the declutched position affects the valve 4j, which permits the operation of the fluid-motor for the gearshift. The difference between the arrangement of Figs. 18B and 18C lies only in the fact that in the arrangement of Fig. 18B the valve 5a—b prevents the action of the fluid motor for the gearshift positively, while in the arrangement of Fig. 18C the valve 5a—b prevents the operation of the fluid-motor for the clutch and therefore indirectly the operation of the fluid motor for the gearshift. The only advantage in the arrangement of Fig. 18C is that the automatic gearshifting may be done independent of the automatic declutching or freewheel action otherwise obtained by the accelerator 6, as shown in Figs. 18, 18A and 18B.

The cross combinations of Figs. 18C and 18, 18A, 18B are considered to be included in the present invention. In any of these combinations and in that shown in Fig. 1, either the independent valve 5b, or valve 6b connected with the accelerator, controls the position of the clutch and the clutch position controls again the operation of the automatic gearshift by means of an intermediate valve of the type of Fig. 2B, valve 4j.

It is therefore evident that if an overrunning or one-way clutch is placed behind the gearbox, that such an automatic shift can be equally effected by connecting this valve 4j directly with the operation of the accelerator pedal instead of with the clutch pedal of a two-way clutch.

In such an arrangement as shown in Fig. 15, see freewheel 89, when the accelerator is released, the gearbox is freed by the freewheel from the vehicle, and the shift pump can shift the gears as these are freed. However, this arrangement is inferior to that shown in which such a valve is operatively associated with a two-way clutch, as with a freewheel the gear transmission will not be freed by said overrunning clutch when the engine speed is greater than the car speed and no reliable shift can be made unless the shift pump is made of very large dimensions so that it is able to pull the gears out of gear at low speeds when the car speed may be below the engine speed.

I claim:

1. A vacuum power and manual gearshifting mechanism for motor vehicles, comprising at least three forward speeds and a reverse gear speed, comprising at least two shiftrods, a gearshift lever to engage said rods manually by a transverse movement thereof when said rods are in neutral position, vacuum power means associated with said manual gearshifting means comprising a single shift cylinder and a single piston therein, operating in two directions to effect a gearshift by combined manual and vacuum power, a manually operated selector valve comprising a single vacuum connection and a single atmospheric connection, said valve having two end ports delivering alternately atmospheric pressure to opposite sides of said piston in said cylinder, and an intermediate port delivering alternately vacuum to opposite sides of said piston in said cylinder, said atmospheric connection comprising a passage extending inside the vacuum connection, and said valve admitting atmospheric pressure to both sides of said piston when it is placed in intermediate position for a neutral position of said piston in said cylinder.

2. Gearshifting mechanism for motor vehicles, comprising at least three speeds forwards and a reverse gearshift, comprising two shift rods, a gearshift lever to engage said rods manually by a transverse movement thereof, vacuum power means in cooperation with said manual means to move said gearshift rods to neutral position and manual means to move said lever from one gearshift rod to the other, said vacuum power means comprising a single shift cylinder and a single piston therein, operating in two directions to effect a gearshift by combined manual and vacuum power, a manually operated selector valve consisting of a single cylindrical tube and a single cylindrical slide valve therein, the slide valve having two end ports connected with the atmospheric pressure, and an intermediate port connected with a source of vacuum, and the cylindrical tube having two end ports connected with end ports of said cylinder, said slide valve distributing atmospheric pressure through said end ports thereof to the end ports of said tube and to the end ports of said cylinder, and said slide valve distributing vacuum from said intermediate port to either end port of said tube and to either end of said cylinder when in neutral or substantially half way position, said cylindrical tube having only one vacuum connection and only one atmospheric connection, and having, in combination with said slide valve, said vacuum and atmospheric connections arranged concentrically of each other.

3. The combination of claim 2, in combination with a two-way clutch between an internal combustion engine and said gearshift, said two-way clutch operated by a fluid motor controlled by the fuel control element or accelerator of a prime mover in said vehicle, so that said two-way clutch may be disengaged when said fuel control element is released to idling position, the manual operation of said gearshift in cooperation with the power operation of said gearshift depending upon the power disengagement of said two-way clutch.

4. A gearshift for motor vehicles, comprising an engine connected with a clutch to a gear transmission, comprising a gear on a driving shaft and a driven shaft having a bearing therein, a gear loosely rotating on said driven shaft, said gears in constant mesh with gears associated with a countershaft parallel to said shafts, and other gears on said driven shaft and countershaft in constant mesh with each other, comprising a plurality of forward gear drives and a reverse gear drive, one of said forward gear drives including an overrunning clutch, another of said forward gear drives at a ratio higher than said first gear drive, being always in positive drive, synchromesh means associated with said second gear drive and splined on said driven shaft, said synchromesh means being cooperative with said overrunning clutch of said first gear drive in this sense, that said synchromesh means can only act upon a gearshift from said lower gear drive to said higher gear drive when said overrunning clutch effects said overrunning action, said lower gear drive functioning again automatically as soon as said higher gear drive has been eliminated.

5. A gearshift for transmission of power, comprising a source of power connected by a clutch with said gear transmission, comprising a gear on a driving shaft and a driven shaft having a bearing therein and a gear loosely rotating on said driven shaft, said gears in constant mesh with gears arranged on a countershaft parallel to said shafts, and other gears on said driven shaft loosely rotating thereon and in constant mesh with gears on said countershaft, a plurality of forward drives therein, one of said drives including an overrunning clutch, another of said gear drives at a higher ratio than said first gear drive having a positive drive, said higher gear drive overrunning said gear drive by means of the said overrunning clutch, shifting means on said driven shaft connected with said higher gear drive to effect said positive gear drive when said overrunning clutch of said lower drive is operating.

6. The combination of claim 4, in combination with a reverse gear drive and shifting means so arranged as to eliminate all of said forward drives simultaneously with the shifting into reverse gear drive.

7. The combination of claim 5, in combination with a reverse drive, and separate shifting means to eliminate the said overrunning drive when shifting into reverse drive, and substantially simultaneously therewith eliminating all of said forward drives.

8. A power transmission gearshift, a prime mover, two-way clutch between said source and said transmission, means to operate said clutch, a plurality of forward drives and a reverse gear drive, all of said forward drives by means of gears in constant mesh, at least a top gear, intermediate and low gear, said low gear including an overrunning clutch, at least one of said forward drives including synchronising means to engage said gear drives in positive drive, said synchronising means adapted to function during the overrunning action of said clutch when a shift is made from said low gear to either one of said high gears, and said positive drive being unable in any shift position to be a freewheel drive.

9. The combination of claim 8, in combination with a reverse drive and a shifting arrangement whereby all forward drives are eliminated before said reverse gear is engaged.

10. A power transmission gearshift, a prime mover, a clutch between said source and transmission, comprising at least three forward drives and one reverse drive therein, all of the forward gears therein in constant mesh, the high and intermediate gear being adjacent to each other, a shiftable unit therebetween to effect said two gears alternatively, synchronising means between said two gears, shifting means, the low and reverse gear being adjacent to each other, said low gear always including a freewheel drive when transmitting power, and shifting means to eliminate all of said forward drives before shifting into said reverse drive.

11. In a semi-automatic gearshift for automobiles, a three speed forward and reverse gearshift, the low and reverse gear being operated from one shift rod and the second and high gear from the other shiftrod, a manually operated selector valve to control a source of vacuum operating on either side of a piston in a single cylinder, said manually-operated selector valve admitting atmospheric pressure and vacuum on opposite sides of said piston in said cylinder to effect a gearshift position, and atmospheric pressure on both sides of said piston in said cylinder to effect neutral position for both of said shiftrods, said piston connected manually by a lever to either one of said shiftrods, manual means to operate said lever, so that any gearshift involving both shiftrods is effected by the cooperation of said manual shifting means and said power shifting means and a prime mover connected by a two-way clutch to said gearshift, manual means to operate said latter clutch in joint cooperation and co-ordination with said manually and power operated gearshift, the latter gearshift depending upon the disengagement of said two-way clutch.

12. The combination of claim 4, in combination with fluid power shifting means, said fluid power means being controlled by the accelerator of said engine, so that said fluid power means can effect a gearshift therein only when said accelerator is released towards idling position.

13. The combination of claim 8, in which at least a part of said shifting is effected by fluid power, said fluid power however being controlled by the accelerator or fuel control element of said prime mover, and preferably being actuated thereby when said accelerator is reduced to substantially idling position.

JEAN A. H. BARKEIJ.